United States Patent
Chen et al.

(10) Patent No.: US 12,495,293 B2
(45) Date of Patent: Dec. 9, 2025

(54) METHOD AND APPARATUS FOR DETERMINING COMMUNICATION MODE, AND STORAGE MEDIUM

(71) Applicant: DATANG MOBILE COMMUNICATIONS EQUIPMENT CO., LTD., Beijing (CN)

(72) Inventors: Shanzhi Chen, Beijing (CN); Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 305 days.

(21) Appl. No.: 18/445,084

(22) PCT Filed: Jul. 30, 2021

(86) PCT No.: PCT/CN2021/109899
§ 371 (c)(1),
(2) Date: Mar. 29, 2023

(87) PCT Pub. No.: WO2022/068371
PCT Pub. Date: Apr. 7, 2022

(65) Prior Publication Data
US 2025/0080975 A1    Mar. 6, 2025

(30) Foreign Application Priority Data
Sep. 29, 2020 (CN) .......................... 202011055931.3

(51) Int. Cl.
*H04W 24/02* (2009.01)
*H04W 8/24* (2009.01)
(Continued)

(52) U.S. Cl.
CPC .......... *H04W 8/245* (2013.01); *H04W 24/02* (2013.01); *H04W 48/16* (2013.01); *H04W 88/06* (2013.01)

(58) Field of Classification Search
CPC ..... H04W 8/245; H04W 24/02; H04W 48/16; H04W 88/06; H04W 4/40; H04W 48/18; H04W 92/18; Y02D 30/70
See application file for complete search history.

(56) References Cited

U.S. PATENT DOCUMENTS

| | | | |
|---|---|---|---|
| 2019/0313469 A1 | 10/2019 | Karampatsis et al. | |
| 2020/0045559 A1* | 2/2020 | Kim | H04W 28/0268 |

(Continued)

FOREIGN PATENT DOCUMENTS

| | | |
|---|---|---|
| CN | 101541064 A | 9/2009 |
| CN | 102369758 A | 3/2012 |

(Continued)

OTHER PUBLICATIONS

3GPP TR 23.764 V17.0.0,3rd Generation Partnership Project;Technical Specification Group Services and System Aspects;Study on enhancements to application layer support for V2X services; (Release 17), Sep. 9, 2020, total 61 pages.

(Continued)

*Primary Examiner* — Lan-Huong Truong
(74) *Attorney, Agent, or Firm* — KILPATRICK TOWNSEND & STOCKTON LLP

(57) ABSTRACT

A method and apparatus for determining a communication mode, and a storage medium, including: receiving a first message sent by a UE; acquiring, according to the first message, first network status information and second network status information corresponding to a target area; determining instruction information, according to the first network status information and the second network status (Continued)

information, where the instruction information is used to determine a target communication mode of the UE, and the target communication mode includes a Uu communication mode for the first type of radio access, a PC5 communication mode for the first type of radio access, a Uu communication mode for the second type of radio access or a PC5 communication mode for the second type of radio access; sending the instruction information to the UE.

20 Claims, 9 Drawing Sheets

(51) Int. Cl.
*H04W 48/16* (2009.01)
*H04W 88/06* (2009.01)

(56) References Cited

U.S. PATENT DOCUMENTS

| | | | | |
|---|---|---|---|---|
| 2021/0022103 | A1* | 1/2021 | Srivastava | H04W 4/02 |
| 2021/0345237 | A1* | 11/2021 | Ge | H04W 76/14 |
| 2023/0027290 | A1* | 1/2023 | Chen | H04W 52/285 |

FOREIGN PATENT DOCUMENTS

| | | |
|---|---|---|
| CN | 102547897 A | 7/2012 |
| CN | 106961704 A | 7/2017 |
| CN | 107018162 A | 8/2017 |
| CN | 109168179 A | 1/2019 |
| CN | 109479225 A | 3/2019 |
| CN | 110650454 A | 1/2020 |
| CN | 110876130 A | 3/2020 |
| CN | 110972212 A | 4/2020 |
| CN | 111133797 A | 5/2020 |
| CN | 111386716 A | 7/2020 |
| CN | 111436139 A | 7/2020 |
| CN | 111447659 A | 7/2020 |
| CN | 111565440 A | 8/2020 |
| WO | 2020063925 A1 | 4/2020 |
| WO | WO-2022042830 A1 * | 3/2022 ......... H04B 7/18504 |

OTHER PUBLICATIONS

Ericsson,"Pseudo-CR on QoS notifications to V2X UE", 3GPP TSG-SA WG6 Meeting #37-e, e-meeting, May 14-26, 2020, total 6 pages, S6-200712(revision of S6-200416).

Huawei,"eNESQO TR: Predictive QoS Areas of improvement", 5GAA Working Group 2 Meeting, 13th WG Brussels Meeting, Feb. 3-5, 2020, total 9 pages, A-200061.

CATT et al.,"Clarifications on V2X USD and V2X server USD", 3GPP TSG-SA WG6 Meeting #36-e, E-meeting, Feb. 24-28, 2020, total 4 pages, S6-200391.

Examination Report of EP Application No. 21874033.0 dated Feb. 11, 2025.

* cited by examiner

METHOD AND APPARATUS FOR DETERMINING COMMUNICATION MODE, AND STORAGE MEDIUM

CROSS-REFERENCE TO RELATED APPLICATIONS

This application is a National Stage of International Application No. PCT/CN2021/109899, filed on Jul. 30, 2021, which claims a priority of the Chinese Patent Application No. 202011055931.3, filed on Sep. 29, 2020. Both of the aforementioned applications are hereby incorporated by reference in their entireties.

FIELD

This application relates to the field of communication technology, and in particular to a method and an apparatus for determining a communication mode, and a storage medium.

BACKGROUND

At present, there are two communication modes in the field of wireless communication, i.e., a communication mode via network and a direct communication mode. In the communication mode via network, if a terminal needs to send data, the data is first sent to a base station through a Uu interface between the terminal and its serving base station. Then the base station sends the received data to an external server via a core network device, and the external server determines whether the data needs to be sent to other terminals. If so, the data is forwarded to a serving base station of a receiving terminal, and the serving base station of the receiving terminal in turn sends the data to the receiving terminal through the Uu interface. In the direct communication mode, the terminals adopt a PC5 interface to realize direct communication therebetween.

Vehicle-to-Everything (V2X) communication is a hot topic in the current communication field. For V2X, if V and X use the above communication mode via network, the V2X may be called V2X communication via network (Uu V2X). If V and X use the above direct communication mode, the V2X may be called V2X direct communication (PC5 V2X). Further, with the development of the 5th generation mobile (5G) communication, the communication modes that a V2X terminal device can support include PC5 communication based on long term evolution (LTE), PC5 communication based on new radio (NR), Uu communication based on LTE and Uu communication based on NR.

Under a scenario of overlapping coverage or discontinuous coverage of two different networks, how to determine an appropriate communication mode for a V2X terminal device is a problem to be solved urgently.

SUMMARY

This application provides a method and an apparatus for determining a communication mode, and a storage medium, by which a terminal device can select an appropriate communication mode under a scenario of overlapping coverage or discontinuous coverage of two different networks, thus the communication performance can be improved.

In an aspect, this application provides a method for determining a communication mode, including:
receiving a first message sent by a terminal device;
acquiring, according to the first message, first network status information and second network status information in a target area, where the first network status information is network status information of a network with a first type of radio access (i.e., the first network status information is network status information upon a network is accessed with a first type of radio access), and the second network status information is network status information of a network with a second type of radio access (i.e., the second network status information is network status information upon a network is accessed with a second type of radio access);
determining instruction information, according to the first network status information and the second network status information, where the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access; and
sending the instruction information to the terminal device.

In this solution, since the above instruction information is determined by the server based on the network status information of networks with different types of radio access in the target area, the terminal device can select an appropriate communication mode even in a scenario of overlapping coverage or discontinuous coverage of two different networks, thus the communication performance can be improved.

In a possible implementation, the first message includes an identifier of a cell of a network with the first type of radio access and an identifier of a cell of a network with the second type of radio access in the target area; and
the acquiring, according to the first message, the first network status information and the second network status information in the target area includes:
determining, according to the first message, to acquire, from a first network system and/or a second network system, the first network status information of a cell of a network with the first type of radio access and the second network status information of a cell of a network with the second type of radio access.

In the solution, according to an identifier of the cell of a network with the first type of radio access and an identifier of the cell of a network with the second type of radio access in the target area that are included in the first message, the V2X application enabler (VAE) server may acquire, from the first network system and/or the second network system, the network status information of a cell of a network with the first type of radio access and the second network status information of the cell of a network with the second type of radio access as indicated by the terminal device. As such, not only the accuracy of the network status information can be improved, but also the efficiency of acquiring the network status information can be improved.

In a possible implementation, the first message includes that information indicating the terminal device has a capacity of supporting PC5 communication for the first type of radio access and a capacity of supporting PC5 communication for the second type of radio access; and
the acquiring, according to the first message, the first network status information and the second network status information in the target area includes:
determining, according to the information indicating that the terminal device has the capacity of supporting PC5 communication for the first type of radio access and the capacity of supporting PC5 communication for the second type of radio access, to acquire the first network status information and the second network status information in the target area, from a first network system and/or a second network system.

In the solution, after the VAE server determines, according to the first message, that the terminal device has a capacity of supporting PC5 communication at the first type of network and a capacity of supporting PC5 communication at the second type of network, the VAE server determines the network status information of the network with the first type of radio access and the second network status information of the network with the second type of radio access. In this way, a situation that PC5 communication mode for the first type of radio access or PC5 communication mode for the second type of radio access is determined as the target communication mode, can be avoided under a situation that the terminal device itself does not have the capacity of supporting PC5 communication for the first type of radio access and supporting PC5 communication for the second type of radio access, and ensuring the selection of a more appropriate target communication mode for the terminal device.

In a possible implementation, the target area includes an area corresponding to a current location of the terminal device; or the target area includes a location area corresponding to the terminal device, where the location area is predicted by analyzing mobility data of the terminal device acquired from a network data analytics function (NWDAF).

In the solution, the target area may include the area corresponding to the current location of the terminal device, which can improve the accuracy of determining the target area. Alternatively, by analyzing the mobility data of the terminal device to predict the location area corresponding to the terminal device, the accuracy of the target area can be improved.

In a possible implementation, the acquiring, according to the first message, the first network status information and the second network status information in the target area includes:

sending a first request message to a first network system or a second network system, where the first request message includes identification information of the target area; and receiving the first network status information and the second network status information in the target area that are sent by the first network system or the second network system; or sending a second request message to each of a first network system and a second network system, where the second request message includes identification information of the target area; and receiving the first network status information in the target area sent by the first network system, and receiving the second network status information in the target area sent by the second network system.

In the solution, the VAE server may acquire the first network status information and the second network status information corresponding to the target area, from the first network system and/or the second network system, and the accuracy of the network status information can be improved.

In a possible implementation, each of the first network status information and the second network status information includes predicted network information in the target area; and the acquiring, according to the first message, the first network status information and the second network status information in the target area includes:

sending a third request message to an NWDAF, according to the first message; and receiving the predicted network information sent by the NWDAF, where the predicted network information includes at least one of load information, wireless coverage information and communication link status information.

In the solution, the VAE server acquires the predicted network information from NWDAF, and the target communication mode of the terminal device can be determined according to the predicted network information. Since the network situation in a future area that the terminal device would move to is considered, the accuracy of the target communication mode can be improved.

In a possible implementation, the instruction information includes identification information of the target communication mode; and the determining the instruction information according to the first network status information and the second network status information includes:

acquiring current communication link status information of the terminal device; and determining the identification information of the target communication mode, according to the current communication link status information of the terminal device, the first network status information and the second network status information.

In the solution, the VAE server may determine suggestion information of the target communication mode, according to the current communication link status information of the terminal device, the first network status information and the second network status information. In this way, after the VAE server sends the suggestion information to the terminal device, the terminal device would directly determine, according to the suggestion information, whether to switch to the target communication mode, without determining the target communication mode. This can not only simplify the processing procedure of the terminal device, but also reduce the power consumption of the terminal device.

In a possible implementation, the instruction information includes auxiliary information, where the auxiliary information includes at least one of the following:

coverage information for the first type of radio access and coverage information for the second type of radio access in the target area; or load information of a cell for the first type of radio access and load information of a cell for the second type of radio access in the target area; or quality of service (QoS) guarantee of a cell for the first type of radio access and QoS guarantee of a cell for the second type of radio access in the target area.

In this solution, after the VAE server determines the above auxiliary information, the VAE server sends the auxiliary information to the terminal device, which may enable the terminal device to determine the appropriate communication mode or communication link in combination with the auxiliary information.

In a possible implementation, the instruction information includes auxiliary information, where the auxiliary information includes at least one of the following:

predicted coverage information for the first type of radio access and predicted coverage information for the second type of radio access in the target area; or predicted load information of a cell for the first type of radio access and predicted load information of a cell for the second type of radio access in the target area; or predicted QoS guarantee of a cell for the first type of radio access and predicted QoS guarantee of a cell for the second type of radio access in the target area.

In the solution, since the auxiliary information includes information predicted by the VAE server, after the auxiliary information is determined and sent to the terminal device, the terminal device may determine communication mode or communication link by combining these predicted information, thus the accuracy of the determined communication mode or communication link can be improved.

In another aspect, this application provides a method for determining a communication mode, including:

sending a first message to a server, where the first message is used to instruct the server to acquire first network status information and second network status information in a target area, and then determine instruction information, according to the first network status information and the second network status information, the first network status information is network status information of a network with a first type of radio access, the second network status information is network status information of a network with a second type of radio access, the instruction information is used to determine a target communication mode of a terminal device, and the target communication mode includes a Uu communication mode for the first type of radio access, a PC5 communication mode for the first type of radio access, a Uu communication mode for the second type of radio access or a PC5 communication mode for the second type of radio access;

receiving the instruction information sent by the server;

determining the target communication mode according to the instruction information.

In this solution, since the above instruction information is determined by the server based on the network status information of networks with different types of radio access in the target area, the terminal device can select an appropriate communication mode even under a scenario of overlapping coverage or discontinuous coverage of two different networks, thus the communication performance can be improved.

In a possible implementation, the first message includes an identifier of a cell of a network with the first type of radio access and an identifier of a cell of a network with the second type of radio access in the target area.

In the solution, according to an identifier of the cell of a network with the first type of radio access and an identifier of the cell of a network with the second type of radio access in the target area that are included in the first message, the VAE server may acquire, from a first network system and/or a second network system, the network status information of a cell of a network with the first type of radio access and the second network status information of the cell of a network with the second type of radio access as indicated by the terminal device. As such, not only the accuracy of the network status information can be improved, but also the efficiency of acquiring the network status information can be improved.

In a possible implementation, the first message includes information indicating that the terminal device has a capacity of supporting PC5 communication for the first type of radio access and a capacity of supporting PC5 communication for the second type of radio access.

In the solution, after the VAE server determines, according to the first message, that the terminal device has a capacity of supporting PC5 communication at the first type of network and a capacity of supporting PC5 communication at the second type of network, the VAE server determines the network status information of the network with the first type of radio access and the second network status information of the network with the second type of radio access. In this way, a situation that PC5 communication mode for the first type of radio access or PC5 communication mode for the second type of radio access is determined as the target communication mode, can be avoided under a situation that the terminal device itself does not have the capacity of supporting PC5 communication for the first type of radio access and supporting PC5 communication for the second type of radio access, and ensuring the selection of a more appropriate target communication mode for the terminal device.

In a possible implementation, the target area includes current location of the terminal device; or the target area includes a location area corresponding to the terminal device, where the location area is predicted by the server through analyzing mobility data of the terminal device acquired from an NWDAF.

In the solution, the target area may include the area corresponding to the current location of the terminal device, which can improve the accuracy of determining the target area. Alternatively, by analyzing the mobility data of the terminal device to predict the location area corresponding to the terminal device, the accuracy of the target area can be improved.

In a possible implementation, the instruction information includes identification information of the target communication mode.

In the solution, after the VAE server sends the identification information of the target communication mode to the terminal device, the terminal device would directly determine, according to the suggestion information, whether to switch to the target communication mode, without determining the target communication mode. This can not only simplify the processing procedure of the terminal device, but also reduce the power consumption of the terminal device.

In a possible implementation, the instruction information includes auxiliary information, where the auxiliary information includes at least one of the following:

coverage information for the first type of radio access and coverage information for the second type of radio access in the target area;

load information of a cell for the first type of radio access and load information of a cell for the second type of radio access in the target area; or QoS guarantee of a cell for the first type of radio access and QoS guarantee of a cell for the second type of radio access in the target area.

In this solution, after the VAE server determines the above auxiliary information, the VAE server sends the auxiliary information to the terminal device, which may enable the terminal device to determine the appropriate communication mode or communication link in combination with the auxiliary information.

In a possible implementation, the instruction information includes auxiliary information, where the auxiliary information includes at least one of the following:

predicted coverage information for the first type of radio access and predicted coverage information for the second type of radio access in the target area;

predicted load information of a cell for the first type of radio access and predicted load information of a cell for the second type of radio access in the target area; or predicted QoS guarantee of a cell for the first type of radio access and predicted QoS guarantee of a cell for the second type of radio access in the target area.

In the solution, since the auxiliary information includes information predicted by the VAE server, after the auxiliary information is determined and sent to the terminal device, the terminal device may determine communication mode or communication link by combining these predicted information, thus the accuracy of the determined communication mode or communication link can be improved.

In a further aspect, this application provides a server, including a memory, a transceiver, and a processor, the memory is configured to store a computer program; the transceiver is configured to send and receive data under control of the processor; and the processor is configured to read the computer program in the memory and perform the following operations:

receiving a first message sent by a terminal device;

acquiring, according to the first message, first network status information and second network status information in a target area, where the first network status information is network status information of a network with a first type of radio access, and the second network status information is network status information of a network with a second type of radio access;

determining instruction information, according to the first network status information and the second network status information, where the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access; and sending the instruction information to the terminal device.

In a possible implementation, the first message includes an identifier of a cell of a network with the first type of radio access and an identifier of a cell of a network with the second type of radio access in the target area; and the processor is specifically configured to:

determine, according to the first message, to acquire, from a first network system and/or a second network system, the first network status information of a cell of a network with the first type of radio access and the second network status information of a cell of a network with the second type of radio access.

In a possible implementation, the first message includes information indicating that the terminal device has a capacity of supporting PC5 communication for the first type of radio access and a capacity of supporting PC5 communication for the second type of radio access; and the processor is specifically configured to:

determine, according to the information indicating that the terminal device has the capacity of supporting PC5 communication for the first type of radio access and the capacity of supporting PC5 communication for the second type of radio access, to acquire the first network status information and the second network status information in the target area, from a first network system and/or a second network system.

In a possible implementation, the target area includes an area corresponding to a current location of the terminal device; or the target area includes a location area corresponding to the terminal device, where the location area is predicted by analyzing mobility data of the terminal device acquired from an NWDAF.

In a possible implementation, the processor is specifically configured to:

send a first request message to a first network system or a second network system, where the first request message includes identification information of the target area; and receive the first network status information and the second network status information in the target area that are sent by the first network system or the second network system; or send a second request message to each of a first network system and a second network system, where the second request message includes identification information of the target area; and receive the first network status information in the target area sent by the first network system, and receive the second network status information in the target area sent by the second network system.

In a possible implementation, each of the first network status information and the second network status information includes predicted network information in the target area; and the processor is specifically configured to:

send a third request message to an NWDAF, according to the first message; and receive the predicted network information sent by the NWDAF, where the predicted network information includes at least one of load information, wireless coverage information and communication link status information.

In a possible implementation, the instruction information includes identification information of the target communication mode; and the processor is specifically configured to:

acquire current communication link status information of the terminal device; and determine the identification information of the target communication mode, according to the current communication link status information of the terminal device, the first network status information and the second network status information.

In a possible implementation, the instruction information includes auxiliary information, where the auxiliary information includes at least one of the following:

coverage information for the first type of radio access and coverage information for the second type of radio access in the target area; or load information of a cell for the first type of radio access and load information of a cell for the second type of radio access in the target area; or QoS guarantee of a cell for the first type of radio access and QoS guarantee of a cell for the second type of radio access in the target area.

In a possible implementation, the instruction information includes auxiliary information, where the auxiliary information includes at least one of the following:

predicted coverage information for the first type of radio access and predicted coverage information for the second type of radio access in the target area; or predicted load information of a cell for the first type of radio access and predicted load information of a cell for the second type of radio access in the target area; or predicted QoS guarantee of a cell for the first type of radio access and predicted QoS guarantee of a cell for the second type of radio access in the target area.

In a further another aspect, this application provides a terminal device, including a memory, a transceiver and a processor, the memory is configured to store a computer program; the transceiver is configured to send and receive data under control of the processor; and the processor is configured to read the computer program in the memory and perform the following operations:

sending a first message to a server, where the first message is used to instruct the server to acquire first network status information and second network status information in a target area, and then determine instruction information, according to first network status information and second network status information, the first network status information is network status information of a network with a first type of radio access, the second network status information is network status information of a network with a second type of radio access, the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access;

receiving the instruction information sent by the server; and determining the target communication mode, according to the instruction information.

In a possible implementation, the first message includes an identifier of a cell of a network with the first type of radio access and an identifier of a cell of a network with the second type of radio access in the target area.

In a possible implementation, the first message includes information indicating that the terminal device has a capacity of supporting PC5 communication for the first type of radio access and a capacity of supporting PC5 communication for the second type of radio access.

In a possible implementation, the target area includes a current location of the terminal device; or the target area includes a location area corresponding to the terminal device, where the location area is predicted by analyzing mobility data of the terminal device acquired from an NWDAF.

In a possible implementation, the instruction information includes identification information of the target communication mode.

In a possible implementation, the instruction information includes auxiliary information, where the auxiliary information includes at least one of the following:

coverage information for the first type of radio access and coverage information for the second type of radio access in the target area;

load information of a cell for the first type of radio access and load information of a cell for the second type of radio access in the target area; or QoS guarantee of a cell for the first type of radio access and QoS guarantee of a cell for the second type of radio access in the target area.

In a possible implementation, the instruction information includes auxiliary information, where the auxiliary information includes at least one of the following:

predicted coverage information for the first type of radio access and predicted coverage information for the second type of radio access in the target area;

predicted load information of a cell for the first type of radio access and predicted load information of a cell for the second type of radio access in the target area; or predicted QoS guarantee of a cell for the first type of radio access and predicted QoS guarantee of a cell for the second type of radio access in the target area.

In a further another aspect, this application provides an apparatus for determining a communication mode, including:

a receiving device, configured to receive a first message sent by a terminal device;

a processing device, configured to acquire, according to the first message, first network status information and second network status information in a target area, where the first network status information is network status information of a network with a first type of radio access, and the second network status information is network status information of a network with a second type of radio access;

the processing device is further configured to determine instruction information, according to the first network status information and the second network status information, where the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access; and a sending device, configured to send the instruction information to the terminal device.

In a possible implementation, the first message includes an identifier of a cell of a network with the first type of radio access and an identifier of a cell of a network with the second type of radio access in the target area; and the processing device is specifically configured to:

determine, according to the first message, to acquire, from a first network system and/or a second network system, the first network status information of the cell of a network with the first type of radio access and the second network status information of the cell of a network with the second type of radio access.

In a possible implementation, the first message includes information indicating that the terminal device has a capacity of supporting PC5 communication for the first type of radio access and a capacity of supporting PC5 communication for the second type of radio access; and the processing device is specifically configured to:

determine, according to the information indicating that the terminal device has the capacity of supporting PC5 communication for the first type of radio access and the capacity of supporting PC5 communication for the second type of radio access, to acquire the first network status information and the second network status information in the target area, from the first network system and/or the second network system.

In a possible implementation, the target area includes an area corresponding to a current location of the terminal device; or the target area includes a location area corresponding to the terminal device, where the location area is predicted by analyzing mobility data of the terminal device acquired from an NWDAF.

In a possible implementation, the processing device is specifically configured to:
  send a first request message to a first network system or a second network system, where the first request message includes identification information of the target area; and receive the first network status information and the second network status information in the target area that are sent by the first network system or the second network system; or
  send a second request message to each of a first network system and a second network system, where the second request message includes identification information of the target area; and receive the first network status information in the target area sent by the first network system, and receive the second network status information in the target area sent by the second network system.

In a possible implementation, each of the first network status information and the second network status information includes predicted network information in the target area; and
  the processing device is specifically configured to:
  send a third request message to an NWDAF, according to the first message; and
  receive the predicted network information sent by the NWDAF, where the predicted network information includes at least one of load information, wireless coverage information and communication link status information.

In a possible implementation, the instruction information includes identification information of the target communication mode; and
  the processing device is specifically configured to:
  acquire current communication link status information of the terminal device; and
  determine the identification information of the target communication mode, according to the current communication link status information of the terminal device, the first network status information and the second network status information.

In a possible implementation, the instruction information includes auxiliary information, where the auxiliary information includes at least one of the following:
  coverage information for the first type of radio access and coverage information for the second type of radio access in the target area; or
  load information of a cell for the first type of radio access and load information of a cell for the second type of radio access in the target area; or
  QoS guarantee of a cell for the first type of radio access and QoS guarantee of a cell for the second type of radio access in the target area.

In a possible implementation, the instruction information includes auxiliary information, where the auxiliary information includes at least one of the following:
  predicted coverage information for the first type of radio access and predicted coverage information for the second type of radio access in the target area; or
  predicted load information of a cell for the first type of radio access and predicted load information of a cell for the second type of radio access in the target area; or
  predicted QoS guarantee of a cell for the first type of radio access and predicted QoS guarantee of a cell for the second type of radio access in the target area.

In a further another aspect, this application provides an apparatus for determining a communication mode, including:
  a sending device, configured to send a first message to a server, where the first message is used to instruct the server to acquire first network status information and second network status information in a target area, and then determine instruction information, according to first network status information and second network status information, the first network status information is network status information of a network with a first type of radio access, the second network status information is network status information of a network with a second type of radio access, the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access;
  a receiving device, configured to receive the instruction information sent by the server; and
  a processing device, configured to determine the target communication mode according to the instruction information.

In a possible implementation, the first message includes an identifier of a cell of a network with the first type of radio access and an identifier of a cell of a network with the second type of radio access in the target area.

In a possible implementation, the first message includes information indicating that the terminal device has a capacity of supporting PC5 communication for the first type of radio access and a capacity of supporting PC5 communication for the second type of radio access.

In a possible implementation, the target area includes current location of the terminal device; or
  the target area includes a location area corresponding to the terminal device, where the location area is predicted by the server through analyzing mobility data of the terminal device acquired from an NWDAF.

In a possible implementation, the instruction information includes identification information of the target communication mode.

In a possible implementation, the instruction information includes auxiliary information, where the auxiliary information includes at least one of the following:
  coverage information for the first type of radio access and coverage information for the second type of radio access in the target area;
  load information of a cell for the first type of radio access and load information of a cell for the second type of radio access in the target area; or
  QoS guarantee of a cell for the first type of radio access and QoS guarantee of a cell for the second type of radio access in the target area.

In a possible implementation, the instruction information includes auxiliary information, where the auxiliary information includes at least one of the following:
  predicted coverage information for the first type of radio access and predicted coverage information for the second type of radio access in the target area;
  predicted load information of a cell for the first type of radio access and predicted load information of a cell for the second type of radio access in the target area; or
  predicted QoS guarantee of a cell for the first type of radio access and predicted QoS guarantee of a cell for the second type of radio access in the target area.

In a further another aspect, this application provides a processor-readable storage medium, which stores a computer program for causing a processor to execute the method for determining a communication mode in any of the possible embodiments.

This application provides a method and apparatus for determining a communication mode, and a storage medium. After the VAE server receives a first message sent by a terminal device, the VAE server determines, according to the first message, network status information of a network with a first type of radio access and network status information of a network with a second type of radio access that correspond to a target area, determines instruction information according to the network status information, and sends the instruction information to the terminal device. As such, the terminal device can determine the target communication mode according to the instruction information. Since the above instruction information is determined by the server based on the network status information of networks with different types of radio access in the target area, the terminal device can select an appropriate communication mode even under a scenario of overlapping coverage or discontinuous coverage of two different networks, thus the communication performance can be improved.

It should be understood that the contents described in the above Summary section are not intended to define embodiments of the present disclosure, nor are they intended to limit the scope of the present disclosure. Other features of the present disclosure will be readily understood from the following description.

BRIEF DESCRIPTION OF THE DRAWINGS

In order to more clearly explain the present application, the following will briefly introduce the drawings that need to be used in the description of the embodiments. The drawings in the following description are some embodiments of the present disclosure.

DESCRIPTION OF EMBODIMENTS

The term "and/or" herein describes the associated relationship of associated objects, indicates there can be three of relationships, for example, A and/or B, which can indicate that A exists alone, A and B exist at the same time, and B exists alone. The character "/" generally indicates that the context object is an "or" relationship.

In the embodiments of this application, the term "a plurality of/more" refers to two or more, and other quantifiers are similar.

The embodiments of this application are described below with reference to the accompanying drawings of the embodiments of this application. The described embodiments are part of the embodiments of this application, rather than all of the embodiments.

The embodiments of this application provide a method and an apparatus for determining a communication mode, by which under a scenario of overlapping coverage or discontinuous coverage of two different networks, a VAE server determines identification information or auxiliary information of a target communication mode, according to network status information of a network with a first type of radio access and network status information of a network with a second type of radio access in a target area; and a V2X terminal device determines the target communication mode according to the identification information or auxiliary information of the target communication mode, and determines whether to perform communication mode switching. In this way, even under the scenario of overlapping coverage or discontinuous coverage of two different networks, the terminal device can determine an appropriate communication mode, thus the communication performance of the system can be improved.

Among which, the method and the apparatus are based on a same application concept. Since the principle of solving the problem is similar, the implementations of the apparatus and the method may be referred to each other, and the repetition is not repeated herein.

Figure 1:
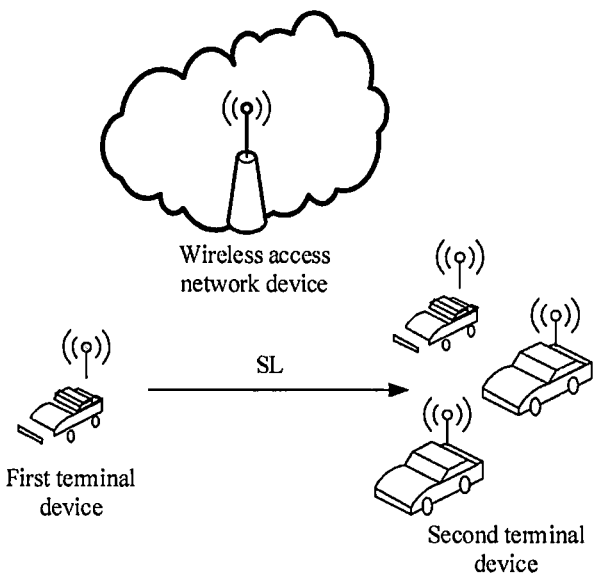
FIG. 1 is a schematic diagram of an application scenario of a method for determining a communication mode provided by an embodiment of this application.

The method for determining a communication mode provided by the embodiments of this application may be applied to the V2X communication scenario shown in FIG. 1. As shown in FIG. 1, a first terminal device and a second terminal device communicate therebetween through a sidelink (Sidelink, SL), which refers to an auxiliary link in a V2X network. In addition to the auxiliary link, there are uplink (uplink) and downlink (downlink) in the V2X network.

Illustratively, V2X communication includes vehicle-to-vehicle (Vehicle-to-Vehicle, V2V) communication, vehicle-to-infrastructure (Vehicle-to-Infrastructure, V2I) communication, vehicle-to-people (Vehicle-to-People, V2P) communication, and vehicle-to-application server (Vehicle-to-Network, V2N) communication. In FIG. 1, only V2V communication in which both the first terminal device and the second terminal device are vehicles is illustrated as an example, and the embodiments of this application do not limit the specific communication scenarios of V2X. For example, communication between the first terminal device and the second terminal device may be intercommunication between vehicle-mounted devices, communication between a road side unit (Road Side Unit, RSU) and a vehicle-mounted device and/or a network device (such as a base station device), communication between a network device (such as a base station device) and a vehicle-mounted device and/or RSU, or the like, where the network device may be a long term evolution (long term evolution, LTE) base station device, a new radio (New Radio, NR) base station, or a base station in a subsequent evolution system.

It can be understood that the embodiments of this application are not limited to the specific forms of the first terminal device and the second terminal device, which is only an exemplary explanation herein. Illustratively, the wireless access network device in FIG. 1 may be a base station or a device in a network providing wireless access. The base station may be an evolved node (eNB) in LTE or a base station in NR network. The base station in NR may include: a new radio base station (NR nodeB, gNB), a new generation evolved base station (NG-eNB), a central unit (CU) and a distributed unit (DU), a transmission receive point (TRP), a transmission point (TP), an access point (AP) of wireless fidelity (WiFi) network or other nodes.

It can be understood that the method for determining a communication mode provided by this application can be applied not only to the sidelink shown in FIG. 1, but also to the cellular link. The embodiments of this application do not limit the scenarios to which the method for determining a communication mode is applied, and the illustration is only exemplary herein. The first terminal device and the second terminal device in the embodiments of this application are communication devices, which may be terminal devices.

The terminal device involved in the embodiments of this application may be a device that provides voice and/or data connectivity to users, a handheld device with a wireless connection function, or other processing device connected to a wireless modem. In different systems, the names of the terminal device may be different. For example, in a 5G system, the terminal device may be called user equipment (UE). The wireless terminal device may communicate with one or more core networks (CN) via a radio access network (RAN). The wireless terminal device may be a mobile terminal device, such as a mobile phone (or referred to as a "cellular" phone) and a computer having a mobile terminal device, for example, it may be portable, pocket-sized, hand-held, computer built-in, or vehicle-mounted mobile apparatuses, that exchange language and/or data with a radio access network, for example, a personal communication service (PCS) phone, a cordless phone, a session initiated protocol (SIP) phone, a wireless local loop (WLL) station, a personal digital assistant (PDA) and other devices. The wireless terminal device may also be referred to as a system, a subscriber device, a subscriber station, a mobile station, a mobile site, a remote station, an access point a remote terminal, an access terminal, a user terminal device, a user agent and a user device, which is not limited in the embodiments of this application.

The network device involved in the embodiments of this application may be a base station, which may include cells providing services for terminals. According to different specific applications, a base station may also be called an access point, or may be a device that communicates with a wireless terminal device through one or more sectors over the air interface in an access network, or in other names. The network device may be configured to exchange the received air frames with Internet Protocol (IP) packets, and act as a router between the wireless terminal device and the rest of the access network which may include the Internet Protocol (IP) communication network. The network device may also coordinate attribute management for the air interface. For example, the network device in the embodiments of this application may be a network device (Base Transceiver Station, BTS) in a global system for mobile communications (GSM) or code division multiple access (CDMA), or may be a network device (NodeB) in a wide-band code division multiple access (WCDMA), or may be an evolved network device (evolved Node B, eNB or e-NodeB) in a long term evolution (Long Term Evolution, LTE) system, a 5G base station (gNB) in a 5G network architecture (next generation system), or may be a home evolved node B (Home evolved Node B, HeNB), a relay node (relay node), a femto base station, a pico base station, or the like, which is not limited by the embodiments of this application. In some network structures, the network device may include a centralized unit (CU) node and a distributed unit (DU) node, and the centralized unit and the distributed unit may also be geographically separated.

One or more antennas may be used for multi input multi output (MIMO) transmission between the above network device and the terminal device, and the MIMO transmission may be a single user MIMO (SU-MIMO) or a multiple user MIMO (MU-MIMO). According to the form and number of the root antenna combination, the MIMO transmission may be 2D-MIMO, 3D-MIMO, FD-MIMO, or massive-MIMO, or may be a diversity transmission or a precoding transmission or a beamforming transmission.

Figure 2:
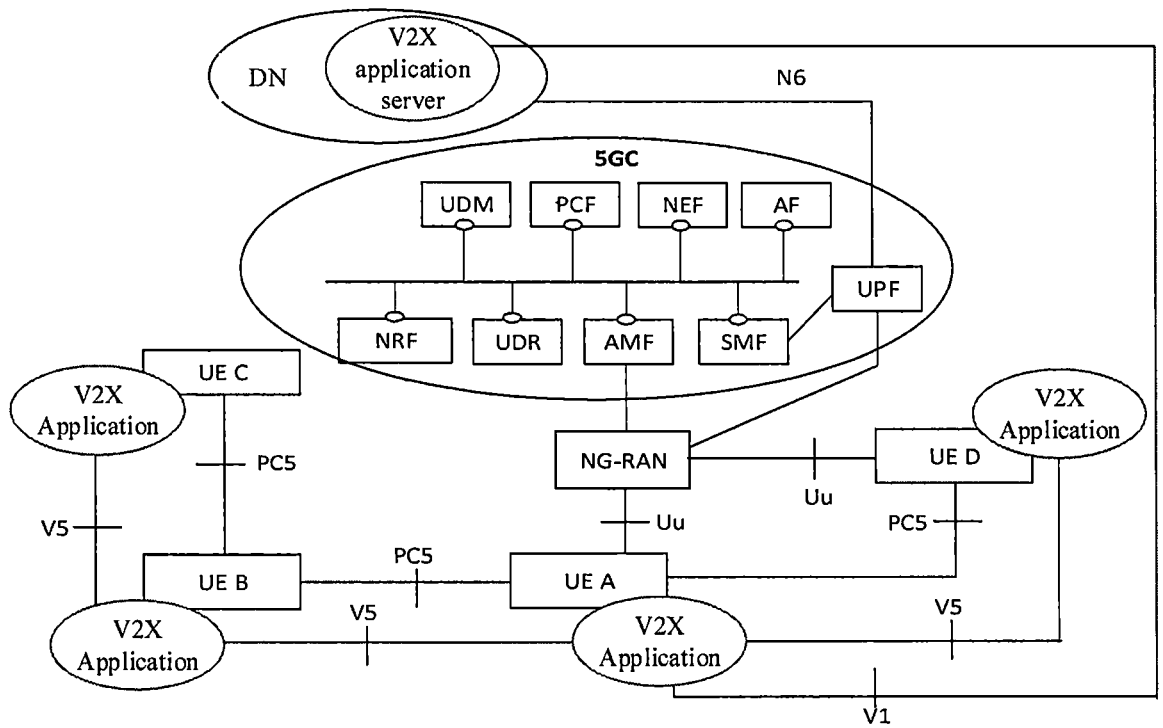
FIG. 2 is a schematic diagram of a V2X communication architecture in a non-roaming scenario applicable to an embodiment of this application.

FIG. 2 is a schematic diagram of a V2X communication architecture in a non-roaming scenario applicable to an embodiment of this application. As shown in FIG. 2, a 5G core network (5G core/new generation core, 5GC/NGC) includes function units, such as an access and mobility management function (AMF) network element, a session management function (SMF) network element, a user plane function (UPF) network element, a policy control function (PCF) network element, an application function (AF) network element, a unified data management (UDM) function network element, a unified data repository (UDR) function network element, network exposure function (NEF) network element and network repository function (NRF) network element. Among which, some network elements in the 5G core network are connected by a bus. As shown in FIG. 2, an AMF network element, an SMF network element, an AF network element, a UDM, a PCF network element, an NRF network element, an NEF network element and a UDR network element are interconnected by the bus.

Among which, the AMF network element is mainly responsible for mobility management, access management and other services. The SMF network element is mainly responsible for session management, UE address management and allocation, dynamic host configuration protocol function, user plane function selection and control, etc. The UPF is mainly responsible for data packet route and forwarding, packet filtering, performing function related to QoS control, and the like that are externally connected to a data network (DN) and a user plane. The UDR network element is mainly used for UDM to store or read subscription data and for PCF to store or read policy data. The PCF network element is mainly responsible for providing a unified policy framework for network behavior management, providing a policy rule of a control plane function, and acquiring registration information related to a policy decision. The UDM entity is mainly responsible for managing user signing context information. The NEF entity is mainly responsible for providing the third party with an interface to access the 3GPP network capability, acquiring a series of states of the network or terminal device, or adjusting and optimizing network performance, influencing user behavior, etc. It should be noted that these function units may work independently, or may be combined together to realize some control functions, for example, an access control and mobility management function such as access authentication, security encryption and location registration for a terminal device, and a session management function such as establishment, release and change of a user plane transmission route.

The function units in 5GC may communicate with each other through the next generation (NG) network interface, for example, the UE may transmit a control plane message with the AMF network element through NG interface 1 (N1 for short), the RAN device may establish a user plane data transmission channel with the UPF through NG interface 3 (N3 for short), the AN/NG-RAN device may establish a control plane signaling connection with the AMF network element through NG interface 2 (N2 for short), the UPF may exchange information with the SMF network element through NG interface 4 (N4 for short), the UPF may exchange user plane data with data network (DN) through NG interface 6 (N6 for short), the AMF network element may exchange information with the SMF network element through NG interface 11 (N11 for short), and the SMF network element may exchange information with the PCF network element through NG interface 7 (N7 for short). It should be noted that FIG. 2 is only an exemplary architecture diagram, and the network architecture may include other function units in addition to those shown in FIG. 2.

In addition, it is illustrated by taking a case where the system includes four UEs as an example, where the direct communication between UEs is realized through PC5 interface, and the communication between UE and NG-RAN device is realized through Uu interface. In addition, there is a V2X application attached to each UE, and the V2X applications communicate with each other through V5 interface. Illustratively, the above four UEs may include a pedestrian, vehicle A, vehicle B and a roadside facility.

In the above communication architecture, V2X application server (V2X AS) includes AF function, which supports the following capabilities: (1) Unicast receiving uplink data sent by UE. (2) Sending data to the UE through unicast. (3) Requesting the NWDAF for the QoS sustainability analysis of possible QoS changes in a geographical area through NEF, and requesting NEF for the notification of QoS changes in a certain geographical area. (4) Providing PC5 V2X communication and UU V2X communication parameters to 5GC. (5) Providing the UE with PC5 V2X communication and UU V2X communication parameters.

The PCF may provide V2X communication parameters to UE and AMF: (1) The V2X policy/parameter of a specific PC5 RAT to be provided to the UE may be determined based on the received PC5 capability of the V2X of the UE. (2) Determining whether to provide V2X policies/parameters to UE for V2X communication on PC5 reference point and/or V2X communication on Uu reference point. (3) Providing the UE with PC5 V2X communication authorization and a policy parameter. (4) Providing the UE with Uu V2X communication policy parameters. (5) Providing PC5 QoS parameters used by NG-RAN to AMF. (6) Acquiring V2X parameters from UDR.

Figure 3:
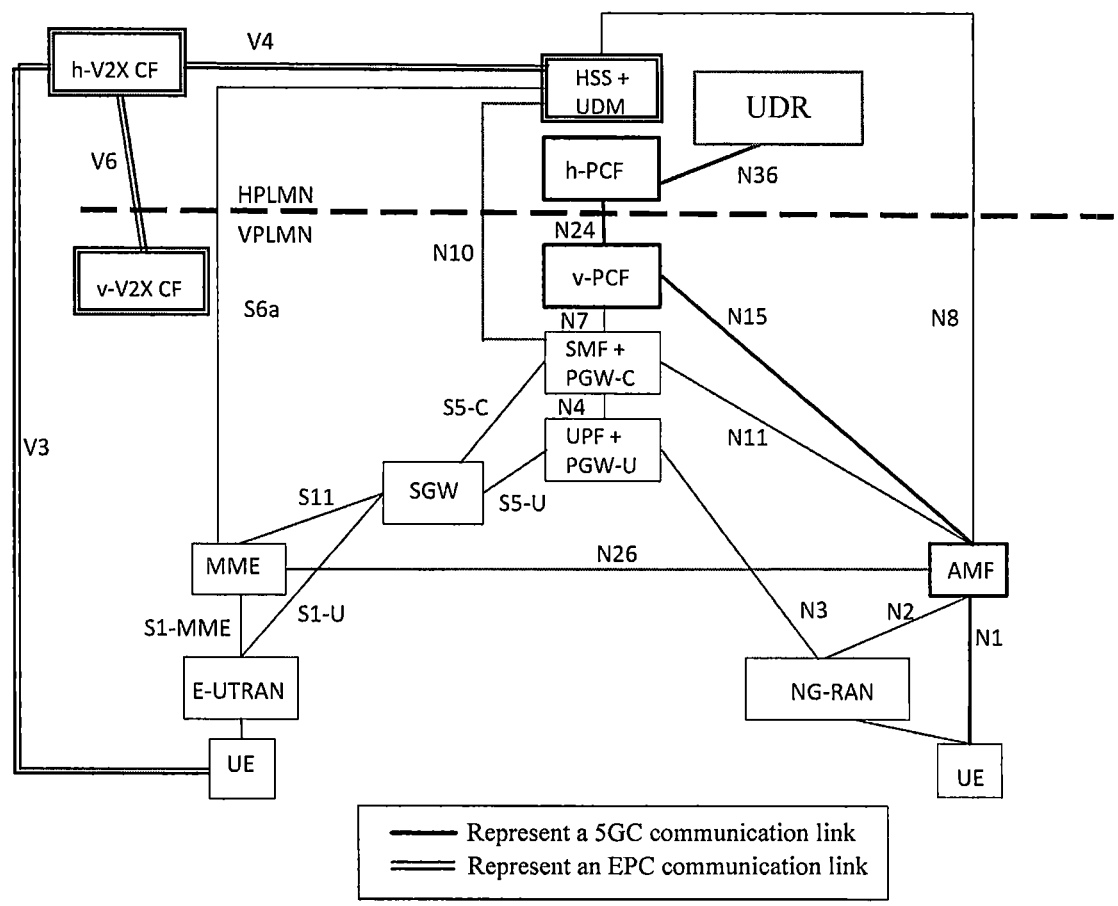
FIG. 3 is a schematic diagram of an interconnection architecture between 5G V2X and EPS V2X applicable to an embodiment of this application.

FIG. 3 is a schematic diagram of the interconnection architecture between 5G V2X and evolved packet system (EPS) V2X applicable to an embodiment of this application. As shown in FIG. 3, the interconnection between 5G V2X and EPS V2X does not need to add a new interface between 5GS and EPS, nor does it affect the network entities in EPC and 5GC. As shown in FIG. 3, UE may switch between 4G and 5G using N26 interface. In terms of the network architecture, the AMF will select a SMF+PGW-C network element to support the switch between 4G and 5G.

When UE is in 5GS or EPS, UE should use legal V2X policies and parameters provided by PCF or V2X control function. V2X parameters for EPS may be provided by PCF or V2X Control Function, while V2X parameters for 5GS may only be provided by PCF. If UE does not have legal V2X policies and parameters, the UE should request the network to provide V2X policies and parameters. The EPS may support V2X communication through the NR PC5 reference point in the network scheduling operation mode.

At present, the terminal device in V2X may simultaneously support various communication modes, including PC5 communication based on LTE, PC5 communication based on NR, Uu communication based on LTE and Uu communication based on NR. However, in the prior art, V2X communication can only be switched between direct communication based on PC5 and indirect communication based on Uu, and it cannot further distinguish PC5 communication based on LTE, PC5 communication based on NR, Uu communication based on LTE and Uu communication based on NR. For example, when the terminal device is in an area where two different networks overlap, for example, in an area where the NR network and the E-UTRA network overlap, at this time, the terminal device may communicate by using any one of PC5 communication based on LTE, PC5 communication based on NR, Uu communication based on LTE and Uu communication based on NR. For another example, when the terminal device is under a scenario where coverage of two different networks are discontinuous, for example, under a scenario where coverage of the NR network and coverage of the E-UTRA network are discontinuous, at this time, when the terminal device adopts any one of the communication modes of PC5 communication based on LTE, PC5 communication based on NR, Uu communication based on LTE and Uu communication based on NR, the signal quality would not be good. Under these two scenarios, how to select the best mode from these four communication modes for the terminal is a problem that needs to be solved urgently at present.

In view of the above problem, the embodiments of this application propose a method for determining a communication mode. In this method, the VAE server acquires, according to a first message sent by a terminal device, network status information of networks with different types of radio access in a target area, for example, acquires network status information of accessing at NR and network status information of accessing at E-UTRA, and then determines identification information or auxiliary information of a target communication mode according to the network status information of networks with different types of radio access, and sends the determined identification information or auxiliary information of the target communication mode to the terminal device. The terminal device may determine the target communication mode based on the identification information or auxiliary information. Since the identification information or auxiliary information of the target communication mode is determined by the VAE server based on the network status information of networks with different types of radio access in the target area, the terminal device can select an appropriate communication mode even under a scenario of overlapping coverage or discontinuous coverage of two different networks, thus the communication performance can be improved. In addition, the V2X terminal device can select different communication modes of V2V based on key performance indicators (KPI) of V2V service. After V2X application layer sends auxiliary information to the V2X terminal device, the terminal device can be assisted in selecting a communication mode, thus the communication performance can be further improved.

It should be noted that when the terminal device communicates with the VAE server, the terminal device needs to support the VAE client, i.e., the VAE client exchanges information with the VAE server.

Figure 4:
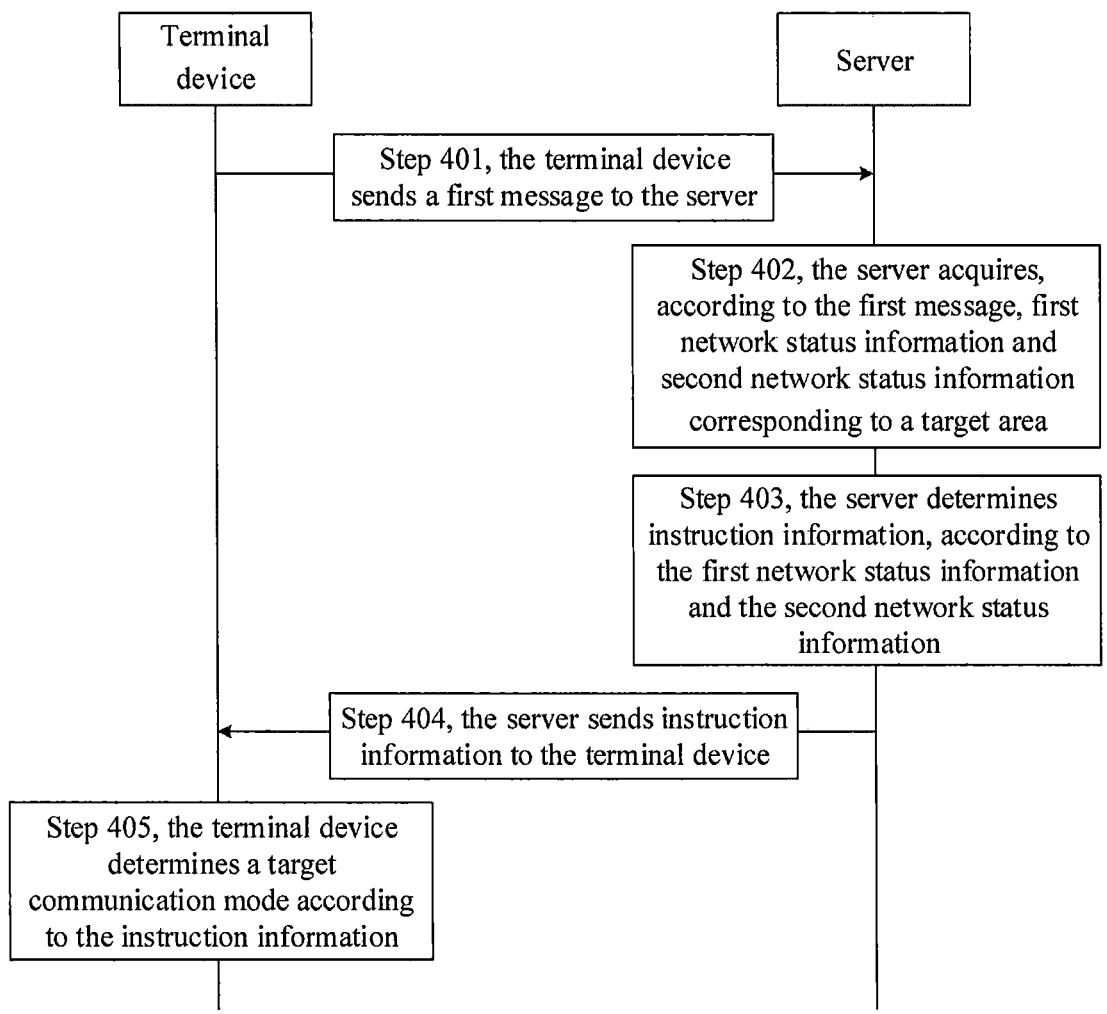
FIG. 4 is a signaling flow chart of a method for determining a communication mode provided by an embodiment of this application.

FIG. 4 is a signaling flow chart of a method for determining a communication mode provided by an embodiment of this application, where the server in the following embodiments may be a VAE server. As shown in FIG. 4, the method includes the following steps.

Step 401, the terminal device sends a first message to the server.

In this step, when the terminal device needs to determine a target communication mode, the terminal device may send the first message to the VAE server, where the first message may be, for example, a request message.

Step 402, the server acquires first network status information and second network status information in a target area according to the first message.

The first network status information is network status information of a network with a first type of radio access; and the second network status information is network status information of a network with a second type of radio access.

In this step, the first type of network may be an NR network, and the second type of network may be an E-UTRA network. Of course, the first type of network and the second type of network may also be other networks, such as 6G network or other networks in the future, and the specific forms for the first type of radio access and the second type of network are not limited herein by the embodiments of this application. In the following embodiments, it is illustrated by taking a case where the first type of network is an NR network and the second type of network is an E-UTRA network, as an example. The specific implementations and principles for other types of networks are similar to those when the first type of network is the NR network and the second type of network is the E-UTRA network, which won't be repeated herein.

After the VAE server receives the first message sent by the terminal device, the VAE server acquires, according to the first message, the network status information of accessing at NR and the network status information of accessing at E-UTRA in the target area respectively. Illustratively, the network status information of accessing at NR may include a coverage level of the NR network, load situation of the NR network, QoS guarantee of the NR network, etc., and the network status information of accessing at E-UTRA may include a coverage level of the E-UTRA network, load situation of the E-UTRA network or QoS guarantee of the E-UTRA network.

Illustratively, when acquiring the first network status information and the second network status information, if the first message includes an identifier of a cell of a network with the first type of radio access and an identifier of a cell of a network with the second type of radio access in the target area, the VAE server determines, according to the first message, to acquire, from a first network system and/or a second network system, the first network status information of the cell of a network with the first type of radio access and the second network status information of the cell of a network with the second type of radio access.

The above first network system may be 5GS, and the second network system may be EPS. Of course, the first network system may also be other systems. In the embodiments of this application, it is only illustrated by taking a case where the first network system is 5GS and the second network system is EPS as an example.

In one embodiment, in a case where the first message sent by the terminal device to the VAE server is a network monitoring information subscription request, when the network monitoring information subscription request includes an identifier of a cell of a network with the first type of radio access and an identifier of a cell of a network with the second type of radio access in the target area, for example, including an identifier of a cell accessed at NR and an identifier of a cell accessed at E-UTRA in the target area, and if 5GS can support two types of networks, NR and E-UTRA, the VAE server may acquire, only from 5GS, each of the first network status information of a cell accessed at NR and the second network status information of a cell accessed at E-UTRA. Alternatively, if the EPS can support two types of networks, NR and E-UTRA, the VAE server may acquire, only from the EPS, the first network status information of a cell accessed at the NR and the second network status information of a cell accessed at the E-UTRA. Alternatively, if 5GS can only support NR network type and EPS can only support E-UTRA network type, the VAE server would acquire from 5GS the first network status information of a cell accessed at NR, and acquire from EPS the second network status information of a cell accessed at E-UTRA.

It can be understood that, if the terminal device accesses the VAE server through 5GS and EPS respectively, the VAE server needs to associate the V2X terminal device identification document (ID) at the application layer. In this scenario, the VAE server would need to acquire the network status information of the target area through NEF and SCEF respectively.

In this embodiment, according to the identifier of the cell of a network with the first type of radio access and the identifier of the cell of a network with the second type of radio access in the target area that are included in the first message, the VAE server may acquire, from a first network system and/or a second network system, network status information of the cell of a network with the first type of radio access and the second network status information of the cell of a network with the second type of radio access as indicated by the terminal device. Thus, not only the accuracy of the network status information can be improved, but also the efficiency of acquiring the network status information can be improved.

For example, if the first message includes information indicating that the terminal device has a capacity of supporting PC5 communication for the first type of radio access and a capacity of supporting PC5 communication for the second type of radio access, the VAE server would determine, according to the information indicating that the terminal device has the capacity of supporting PC5 communication for the first type of radio access and the capacity of supporting PC5 communication for the second type of radio access, to acquire the first network status information and the second network status information corresponding to the target area, from the first network system and/or the second network system.

In one embodiment, in a case where the first message sent by the terminal device to the VAE server is a registration request, when the registration request includes information indicating that the terminal device has a capacity of supporting PC5 communication for the first type of radio access and a capacity of supporting PC5 communication for the second type of radio access, including for example information indicating that the terminal device has a capacity of supporting the LTE PC5 communication and a capacity of supporting the NR PC5 communication, and if 5GS can support two types of networks, NR and E-UTRA, the VAE server may acquire, only from 5GS, each of the first network status information and the second network status information. Alternatively, if the EPS can support two types of networks, NR and E-UTRA, the VAE server may acquire, only from the EPS, each of the first network status information and the second network status information. Alternatively, if 5GS can only support NR network type and EPS can only support E-UTRA network type, the VAE server would acquire from 5GS the first network status information, and acquire from EPS the second network status information.

In this embodiment, after the VAE server determines, according to the first message, that the terminal device has a capacity of supporting PC5 communication at the first type of network and a capacity of supporting PC5 communication at the second type of network, the VAE server determines the network status information of the network with the first type of radio access and the second network status information of the network with the second type of radio access. In this way, a situation that PC5 communication mode for the first type of radio access or PC5 communication mode for the second type of radio access is determined as the target communication mode, can be avoided under a situation that the terminal device itself does not have the capacity of supporting PC5 communication for the first type of radio access and supporting PC5 communication for the second type of radio access, and ensuring the selection of a more appropriate target communication mode for the terminal device.

Next, the procedure that the VAE server acquires, from the first network system and/or the second network system, the first network status information and the second network status information corresponding to the target area will be described in detail.

Illustratively, when both the first network status information and the second network status information include current network information in the target area, if the first network system can support both the first type of network and the second type of network, for example, if the 5GS can support two types of networks, NR and E-UTRA, the VAE server may send a first request message to the 5GC in the 5GS, where the first request message includes identification information of the target area. After the 5GC receives the first request message, the 5GC would acquire, from the eNB, the first network status information of accessing at NR and the second network status information of accessing at E-UTRA that correspond to the target area, and return the acquired first network status information and second network status information to the VAE server.

If the second network system can support the first type of network and the second type of network simultaneously, for example, if the EPS can simultaneously support two types of networks, NR and E-UTRA, the VAE server may send a first request message to the EPC in the EPS, where the first request message includes identification information of the target area. After the EPC receives the first request message, the 5GC would acquire, from the gNB, the first network status information of accessing at NR and the second network status information of accessing at E-UTRA that correspond to the target area, and return the acquired first network status information and the second network status information to the VAE server.

If the first network system supports only the first type of network and the second network system supports only the second type of network, for example, if the 5GS can support NR network type and the EPS can support E-UTRA network type, the VAE server would send a second request message to each of 5GC in 5GS and EPC in EPS, where the second request message includes identification information of the target area. After the 5GC receives the second request message, the 5GC would acquire, from the eNB, the first network status information of accessing at NR that corresponds to the target area, and return the acquired first network status information to the VAE server. After the EPC receives the second request message, the EPC would acquire, from the gNB, the second network status information of accessing at E-UTRA that corresponds to the target area, and return the acquired second network status information to the VAE server.

The above network status information includes one or more of a coverage level, load situation and QoS guarantee.

In this embodiment, the VAE server may acquire, from the first network system and/or the second network system, the first network status information and the second network status information corresponding to the target area, and thus the accuracy of the network status information can be improved.

Illustratively, when the first network status information and the second network status information both include predicted network information in the target area, the determining, according to the first message, the first network status information and the second network status information corresponding to the target area, mat be that: the VAE server sends a third request message to an NWDAF according to the first message, and receives the above predicted network information sent by the NWDAF, where the predicted network information includes at least one of load information, wireless coverage information and communication link condition information.

Figure 5:
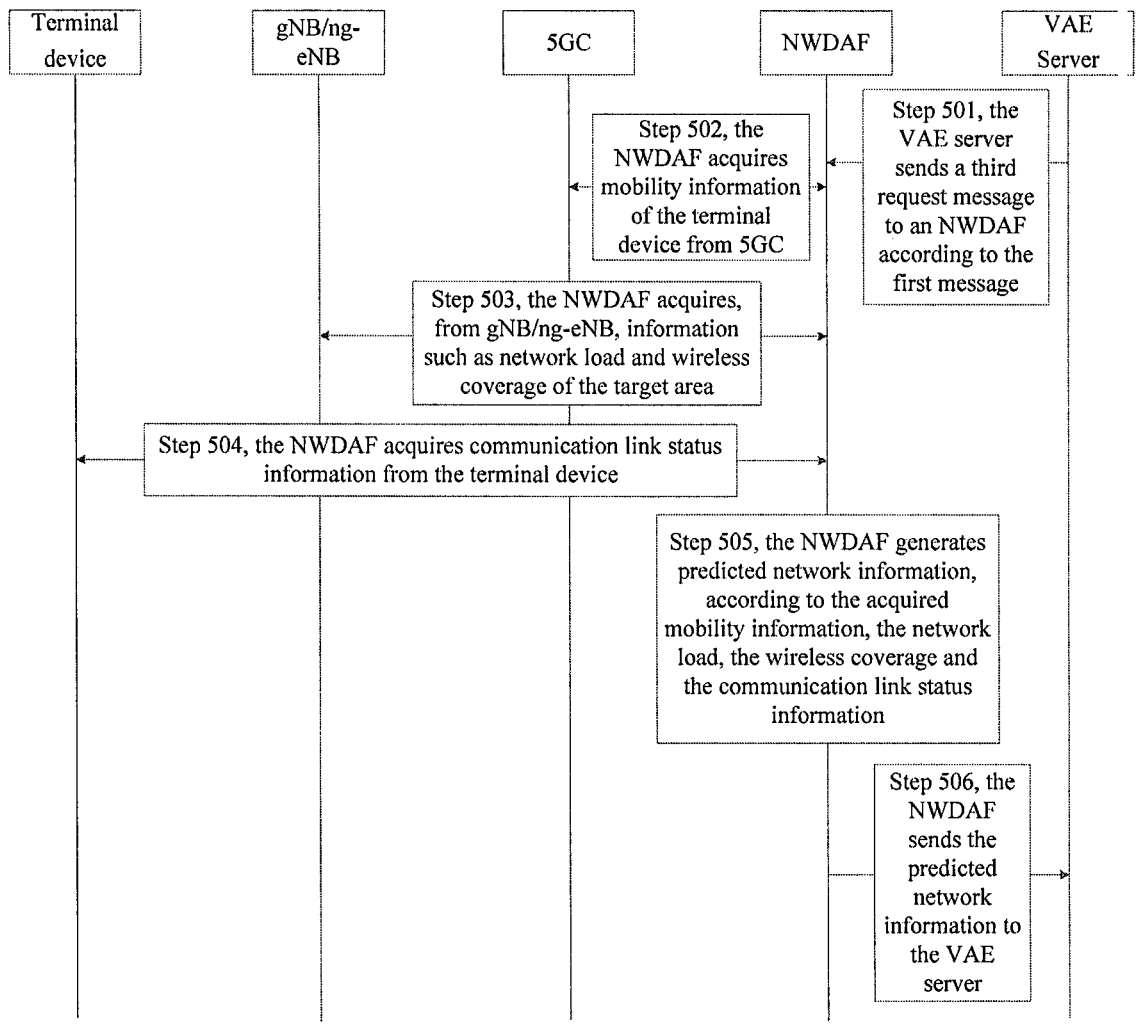
FIG. 5 is a signaling flow chart for acquiring predicted network information.

In one embodiment, FIG. 5 is a signaling flow chart for acquiring predicted network information. As shown in FIG. 5, the step of acquiring predicted network information includes the following steps.

Step 501, the VAE server sends a third request message to the NWDAF according to the first message.

Step 502, the NWDAF acquires mobility information of the terminal device from 5GC.

The NWDAF sends a request message to the 5GC, and the 5GC acquires the mobility information of the terminal device according to the request message.

Step 503, the NWDAF acquires, from gNB/ng-eNB, information such as network load and wireless coverage of the target area.

Step 504, the NWDAF acquires communication link status information from the terminal device.

The communication link status information includes a communication mode, a communication QoS, etc.

It can be understood that there is no sequential relationship between the above steps 502-503, and any one of these steps may be executed first, and then the other steps thereof may be executed; or, any two of these steps may be executed at the same time, and then another step thereof may be executed; or these three steps may be executed at the same time.

Step 505, the NWDAF generates predicted network information, according to the acquired mobility information, the network load, the wireless coverage and the communication link status information.

Step 506, the NWDAF sends the predicted network information to the VAE server.

The predicted network information may be determined network status information of a future location or a predicted target area of the terminal device. The predicted network information includes, for example, load information, wireless coverage information and communication link status information.

Illustratively, Table 1 shows contents included in the predicted network information:

TABLE 1

| Type | Description |
| --- | --- |
| Time | Time condition |
| Geographical area | Geographic area information, such as latitude and longitude information, used to be mapped to E-UTRA cell where the terminal device is located or a predicted cell where it is located |
| Congestion level prediction (E-UTRA cell or predicted cell) | Predicted status of congestion degree in E-UTRA cell where terminal device is located or in a predicted cell |
| Load level prediction (E-UTRA cell or predicted cell) | Predicted status of overload degree in E-UTRA cell where terminal device is located or in a predicted cell |
| Coverage level prediction (E-UTRA cell or predicted cell) | Prediction status of network coverage degree in the E-UTRA cell where the terminal device is located or in a predicted cell, whose value may include no coverage, poor coverage and good coverage |
| Congestion level prediction (NR cell or predicted cell) | Prediction status of congestion degree in NR cell where terminal device is located or in a predicted cell |
| Load level prediction (NR cell or predicted cell) | Prediction status of overload degree in NR cell where terminal device is located or in a predicted cell |
| Coverage level prediction (NR cell or predicted cell) | Prediction status of network coverage degree in a NR cell where the terminal device is located or in a predicted cell, whose value may be determined according to signal strength of the base station, and the specific values thereof may be, for example, no coverage, poor coverage, good coverage. |
| Service type | Values may be driving safety classes, information service classes, and traffic efficiency classes |
| Communication mode option | Values may be LTE Uu, LTE PC5, NR Uu and NR PC5 |
| Communication QoS (bandwidth, packet loss rate) | |

As shown in Table 1 above, the predicted network information may include predicted network status information of cells accessed at different types of networks within a certain time range and a certain geographical area, such as predicted network status information of a cell accessed at E-UTRA and predicted network status information of a cell accessed at NR in the target area. The predicted network status information includes congestion level prediction information, load level prediction information and coverage level prediction information. In addition, the predicted network information also includes service type of the terminal device and communication QoS prediction information, where the communication QoS prediction information includes a communication mode option and communication QoS information, and the communication QoS information may include, for example, bandwidth and packet loss rate.

In this embodiment, the VAE server acquires the predicted network information from the NWDAF, and the target communication mode of the terminal device may be determined according to the predicted network information. Since the network situation in a future area that the terminal device would move to is considered, the accuracy of the target communication mode can be improved.

Further, in the above implementations, the target area may include an area corresponding to a current location of the terminal device; or it may be location area corresponding to the terminal device that is predicted by analyzing the mobility data of the terminal device acquired from the NWDAF.

In one embodiment, when the terminal device communicates with the VAE server, the VAE server may acquire the current location of the terminal device, and may determine the current location of the terminal device or an area surrounding the location within a preset range, as an area corresponding to the current location of the terminal device, i.e., the target area. This approach can improve the accuracy of determining the target area. For example, an area covered by a circle, which takes the current location of the terminal device as the center and has a radius of 100 meters, may be determined as the target area. In addition, when the VAE server determines the location of UE (such as a cell or a tracking area) as the target area, the VAE server may not explicitly indicate information on the target area to the mobile network.

In addition, the VAE server may also acquire the mobility data of the terminal device from the NWDAF, where the mobility data may include a movement trajectory of the terminal device. By analyzing the movement trajectory of the terminal device, a possible area where the terminal device would move to may be predicted. It can also be understood that the VAE server predicts, according to the movement trajectory of the terminal device, the location of the terminal device at the current time moment or at the next time moment, and to determine the target area according to this location. The accuracy of the target area can be improved, by analyzing the mobility data of the terminal device to predict the location area corresponding to the terminal device.

Step 403, the server determines instruction information, according to the first network status information and the second network status information.

The instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access.

In this step, the VAE server would generate instruction information, after acquiring the first network status information and the second network status information. The instruction information may include identification information of the target communication mode, or auxiliary information, where the auxiliary information may be used to assist the terminal device in determining the target communication mode.

In one possible implementation, when the VAE server generates the identification information of the target communication mode, the VAE server would acquire the current communication link status information of the terminal device, and determine the identification information of the target communication mode, according to the current communication link status information of the terminal device, the first network status information and the second network status information.

Based on the implementation of the device, the VAE server may first determine whether the current communication link status of the terminal device can meet the communication requirements, if not, determine which network may meet the communication requirements according to the first network status information and the second network status information, and then according to the operator's strategy, determine, from the selected network, which target communication mode should be selected for the terminal device. For example, the VAE server determines whether the current NR PC5 communication of the terminal device can meet the communication requirements, if not, the VAE server collects load situation and/or coverage situation of the NR cell and the E-UTRA cell where the terminal device is located; if the congestion level in the NR cell is high and the congestion level in the E-UTRA cell is low, the VAE server further determines the target communication mode according to the communication management strategy for the terminal device, for example, if PC5 direct communication may be preferred for the terminal device, the target communication mode is determined as E-UTRA PC5 communication mode.

The suggestion information includes contents shown in Table 2:

TABLE 2

| Type | Related description |
| --- | --- |
| Time | Time condition |
| Geographical area | Geographical area information, such as latitude and longitude information |
| E-UTRA cell | Network status information of E-UTRA cell in the target area |
| NR cell | Network status information of NR cell in the target area |
| Service type | Values may be driving safety classes, information service classes, and traffic efficiency classes |
| Communication mode suggestion | Values may be LTE Uu, LTE PC5, NR Uu and NR PC5 |

As shown in Table 2, the generated suggestion information includes the identification information of the target communication mode determined by the VAE server.

In this embodiment, the VAE server may determine suggestion information of the target communication mode, according to the current communication link status information of the terminal device, the first network status information and the second network status information. In this way, after the VAE server sends the suggestion information to the terminal device, the terminal device would directly determine, according to the suggestion information, whether to switch to the target communication mode, without determining the target communication mode. This can not only simplify the processing procedure of the terminal device, but also reduce the power consumption of the terminal device.

In another possible implementation, if the instruction information is auxiliary information, the VAE server may also generate the auxiliary information, based on the first network status information and the second network status information. After the VAE server sends the auxiliary information to the terminal device, the terminal device may determine the target communication mode according to the auxiliary information.

Illustratively, the VAE server may directly make the acquired first network status and second network condition serve as auxiliary information, an send it to the terminal device.

Illustratively, the above auxiliary information may include at least one of the following information: coverage information for the first type of radio access and coverage information for the second type of radio access in the target area; alternatively, load information of a cell for the first type of radio access and load information of a cell for the second type of radio access in the target area; alternatively, QoS guarantee of a cell for the first type of radio access and QoS guarantee of a cell for the second type of radio access in the target area.

In this embodiment, after determining the above auxiliary information, the VAE server sends the auxiliary information to the terminal device, which may enable the terminal device to determine an appropriate communication mode or communication link in combination with the auxiliary information.

Illustratively, the above auxiliary information may also include at least one of the following information: predicted coverage information for the first type of radio access and predicted coverage information for the second type of radio access in the target area; alternatively, predicted load information of a cell for the first type of radio access and predicted load information of a cell for the second type of radio access in the target area; alternatively, predicted QoS guarantee of a cell for the first type of radio access and predicted QoS guarantee of a cell for the second type of radio access in the target area.

In this embodiment, since the auxiliary information includes information predicted by the VAE server, after the auxiliary information is determined and sent to the terminal device, the terminal device may determine a communication mode or communication link by combining these predicted information, thus the accuracy of the determined communication mode or communication link can be improved.

In one embodiment, the auxiliary information includes contents shown in Table 3:

TABLE 3

| Type | Related description |
| --- | --- |
| Time | Time condition |
| Geographical area | Geographic area information, such as latitude and longitude information, used to be mapped to the E-UTRA cell where the terminal device is located or a predicted cell where it is located |
| Congestion level (E-UTRA cell) | Status of congestion degree in the E-UTRA cell where the terminal device is located, or prediction status of congestion degree in a predicted cell |
| Load level (E-UTRA cell) | Status of overload degree in the E-UTRA cell where the terminal device is located, or prediction status of overload degree in a predicted cell |
| Coverage level (E-UTRA cell) | Prediction status of network coverage level in E-UTRA cell where the terminal device is located or network coverage level in a predicted cell, whose value may be determined according to signal strength of the base station, and the specific values may be, for example, no coverage, poor coverage, and good coverage |
| Congestion level (NR cell) | Prediction status of congestion degree in NR cell where terminal device is located or congestion degree in a predicted cell |
| Load level (NR cell) | Prediction status of overload degree in NR cell where terminal device is located or overload degree in a predicted cell |
| Coverage level (NR cell) | Prediction status of coverage degree in an NR cell where the terminal device is located or coverage degree in a predicted cell, whose value may be determined |

TABLE 3-continued

| Type | Related description |
|---|---|
| | according to signal strength of the base station, and the specific values may be, for example, no coverage, poor coverage, and good coverage. |

In this embodiment, the VAE server may determine the auxiliary information, according to the first network status information and the second network status information. As such, after the VAE server sends the auxiliary information to the terminal device, the terminal device may determine the target communication mode according to the auxiliary information, and the accuracy of the target communication mode can be improved.

Step 404, the server sends instruction information to the terminal device.

In this step, after the VAE server determines the instruction information, the VAE server would send the instruction information to the terminal device.

Step 405, the terminal device determines the target communication mode according to the instruction information.

In this step, if the instruction information includes the identification information of the target communication mode, the terminal device may directly determine the target communication mode according to the identification information, and determine whether to initiate communication mode switching, for example, switching from the NR PC5 communication mode to the E-UTRA PC5 communication mode.

If the instruction information includes auxiliary information, the terminal device determines the target communication mode according to the auxiliary information. The specific approach of determining the target communication mode depends on the implementation of the device. Possible implementations include that: the terminal device first determines whether the current communication link status can meet the communication requirements, if not, determines, according to the auxiliary information, which network may meet the communication requirements, and then selects the target communication mode from the selected networks according to the operator's strategy. For example, the terminal device determines whether the current NR PC5 communication can meet the communication requirements, and if not, determines, according to the auxiliary information, one or more of the congestion degree, load situation and coverage situation of the NR cell and the E-UTRA cell where the terminal device is located. If the terminal device determines that the congestion degree of the E-UTRA cell is high and the congestion degree of the NR cell is low, the terminal device may determine the target communication mode as NR PC5 communication mode or NR Uu communication mode. Alternatively, if the terminal device determines that the load of the E-UTRA cell is high and the load of the NR cell is low, the terminal device may determine the target communication mode as the NR PC5 communication mode or the NR Uu communication mode. Alternatively, if the terminal device determines that the coverage level of NR cell is poor and the coverage level of E-UTRA cell is good, the terminal device may determine the target communication mode as E-UTRA PC5 communication mode or E-UTRA Uu communication mode.

Further, the terminal device may also determine the target communication mode according to the communication management strategy for the terminal device. For example, if PC5 direct communication may be preferred for the terminal device, the target communication mode is determined as E-UTRA PC5 communication mode or NR PC5 direct communication mode.

In the method for determining a communication mode provided by the embodiments of this application, after the VAE server receives a first message sent by a terminal device, the VAE server determines, according to the first message, network status information of a network with a first type of radio access and network status information of a network with a second type of radio access that correspond to a target area, determines instruction information according to the network status information, and sends the instruction information to the terminal device, and the terminal device may determine the target communication mode according to the instruction information. Since the above instruction information is determined by the server based on the network status information of networks with different types of radio access in the target area, the terminal device can select an appropriate communication mode even under a scenario of overlapping coverage or discontinuous coverage of two different networks, thus the communication performance can be improved.

Below, by taking a case where the instruction information is the suggestion information and auxiliary information of the target communication mode as an example, the interaction procedures between various network elements will be explained in detail.

Figure 6:
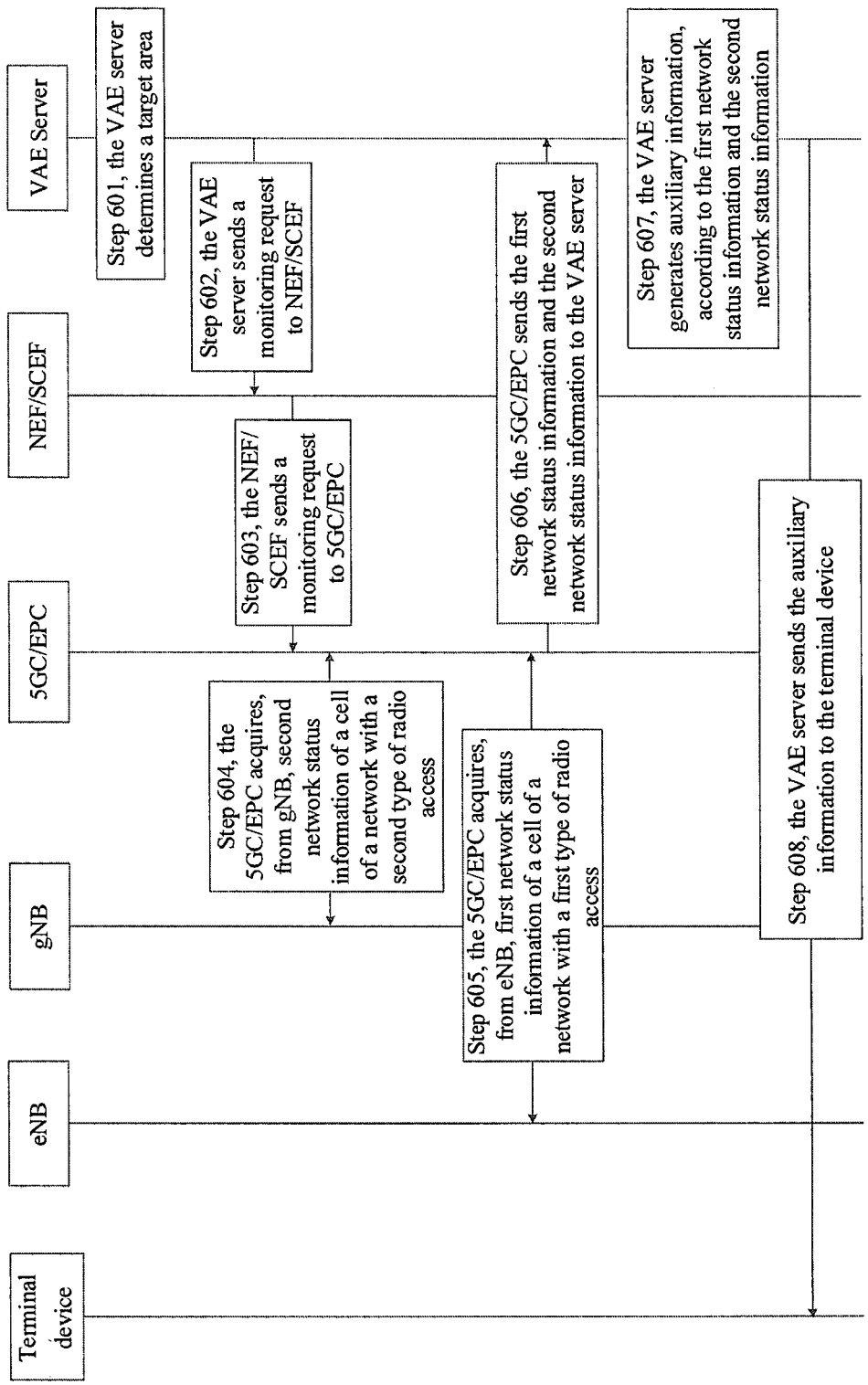
FIG. 6 is a signaling flow chart of a method for determining a communication mode provided by another embodiment of this application.

FIG. 6 is a signaling flow chart of a method for determining a communication mode provided by another embodiment of this application. As shown in FIG. 6, the method includes the following steps.

Step 601, the VAE server determines a target area.

The target area may include an area corresponding to a current location of a terminal device, and may also include a location area corresponding to the terminal device predicted by analyzing mobility data of the terminal device acquired from an NWDAF.

Step 602, the VAE server sends a monitoring request to NEF/SCEF.

The monitoring request includes an identifier of a cell accessed at NR and an identifier of a cell accessed at E-UTRA in the target area. The monitoring request is used to request 5GC/EPC to provide first network status information of the cell accessed at NR and second network status information of the cell accessed at E-UTRA in the target area.

Step 603, the NEF/SCEF sends the monitoring request to 5GC/EPC.

Step 604, the 5GC/EPC acquires, from gNB, the second network status information of the cell of a network with the second type of radio access.

Step 605, the 5GC/EPC acquires, from eNB, the first network status information of the cell of a network with the first type of radio access.

There is no sequential relationship between step 604 and step 605, and step 604 may be executed first and then step 605 is executed, or step 605 may be executed first and then step 604 is executed, or step 604 and step 605 may be executed simultaneously.

Step 606, the 5GC/EPC sends the first network status information and the second network status information to the VAE server.

Step 607, the VAE server generates auxiliary information, according to the first network status information and the second network status information.

Step 608, the VAE server sends the auxiliary information to the terminal device.

In the method for determining a communication mode provided by the embodiments of this application, the VAE server may generate auxiliary information, according to first network status information and second network status information, and send the auxiliary information to a terminal device, and the terminal device may determine an appropriate communication mode. Since the above auxiliary information is determined by the server based on the network status information of networks with different types of radio access in the target area, the terminal device can select an appropriate communication mode even under a scenario of overlapping coverage or discontinuous coverage of two different networks, thus the communication performance can be improved.

Figure 7:
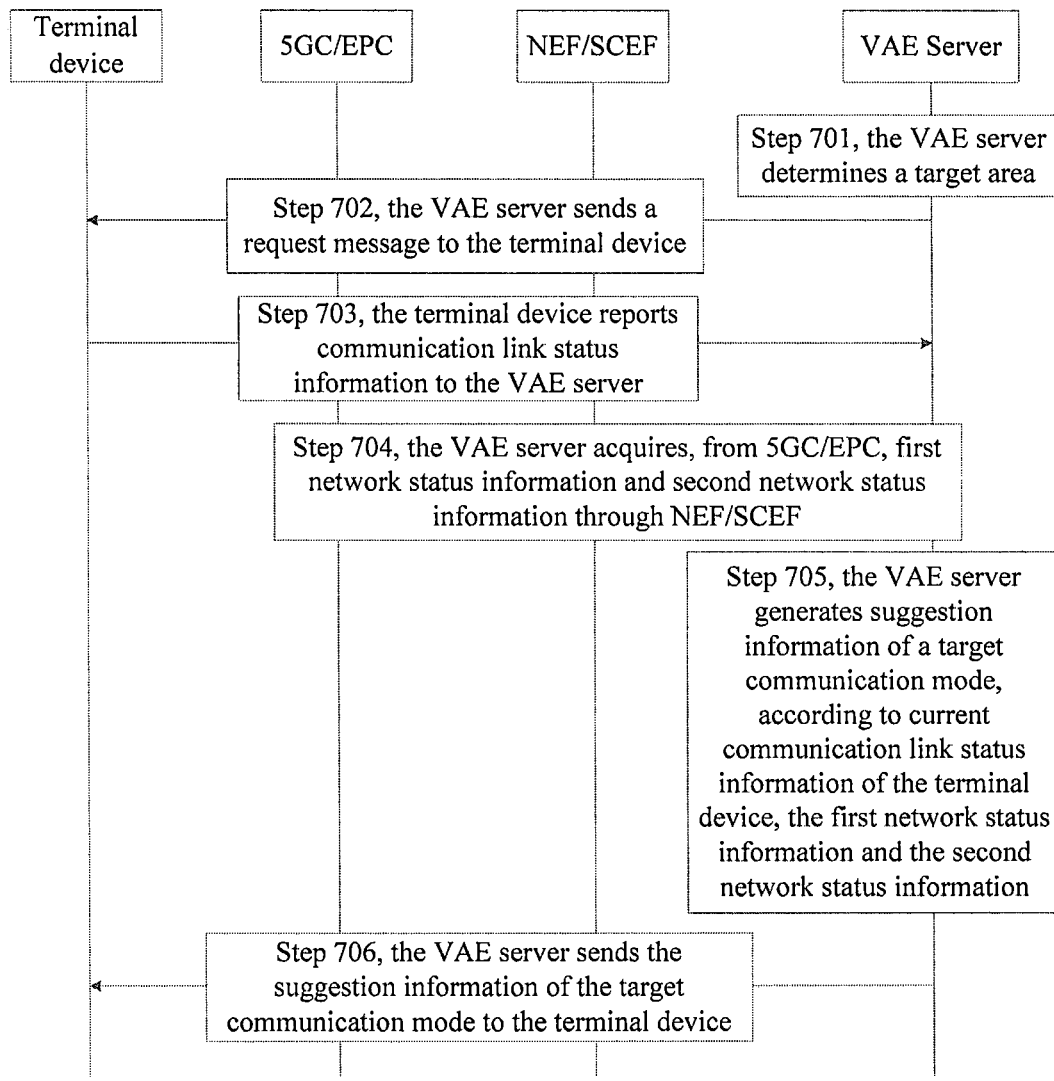
FIG. 7 is a signaling flow chart of a method for determining a communication mode provided by yet another embodiment of this application.

FIG. 7 is a signaling flow chart of a method for determining a communication mode provided by yet another embodiment of this application. As shown in FIG. 7, the method includes the following steps.

Step 701, a VAE server determines a target area.

The target area may include an area corresponding to a current location of the terminal device, and may also include a location area corresponding to the terminal device predicted by analyzing mobility data of the terminal device acquired from an NWDAF.

Step 702, the VAE server sends a request message to the terminal device.

The request message is used to request acquisition of current communication link status information of the terminal device.

In one embodiment, the VAE server may subscribe to the terminal device for the terminal device's communication link status information, such as a current V2V service type, a current communication mode (NR PC5 communication mode or LTE PC5 communication mode), QoS guarantee capability and communication quality, where the QoS guarantee capability includes uplink and downlink rate or packet loss rate or the like.

Step 703, the terminal device reports the communication link status information to the VAE server.

Step 704, the VAE server acquires, from 5GC/EPC, first network status information and second network status information through NEF/SCEF.

The specific implementation of acquiring the first network status information and the second network status information by the VAE server may refer to the relevant descriptions in the previous embodiments, which won't be repeated herein.

Step 705, the VAE server generates suggestion information of a target communication mode, according to the current communication link status information of the terminal device, the first network status information and the second network status information.

Step 706, the VAE server sends the suggestion information of the target communication mode to the terminal device.

In the method for determining a communication mode provided by the embodiments of this application, the VAE server may generate suggestion information, according to current communication link status information of a terminal device, first network status information and second network status information, and send the suggestion information to the terminal device, and the terminal device may determine whether to perform communication mode switching. Since the above suggestion information is determined by the server based on network status information of networks with different types of radio access in the target area, the terminal device can select an appropriate communication mode even under a scenario of overlapping coverage or discontinuous coverage of two different networks, thus the communication performance can be improved. In addition, since the VAE server can directly send identification information of the target communication mode to the terminal device, and the processing procedure of the terminal can be simplified and power consumption thereof is saved.

Figure 8:
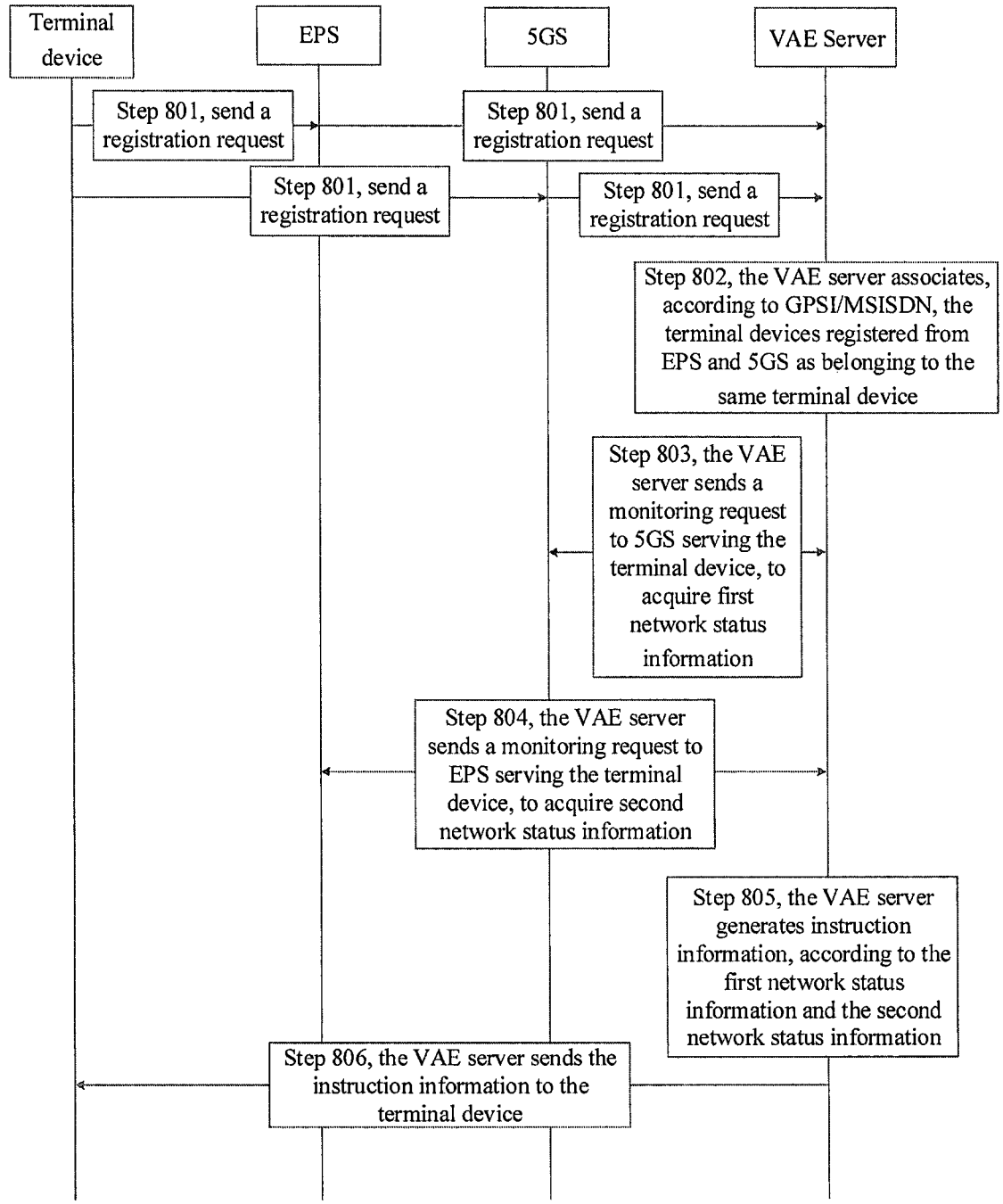
FIG. 8 is a signaling flow chart of a method for determining a communication mode provided by yet another embodiment of this application.

FIG. 8 is a signaling flow chart of a method for determining a communication mode provided by yet another embodiment of this application. In this embodiment, the operating procedure that the terminal device accesses a VAE server through an LTE network and a 5G network which are independent is shown. When the terminal device accesses the VAE server through 5GS and EPS respectively, the VAE server needs to associate identification information (ID) of the V2X terminal device at the application layer. As shown in FIG. 8, the method includes the following steps.

Step 801, a terminal device sends a registration request to each of EPS and 5GS.

When a V2X terminal device accesses a VAE server through E-UTRAN and NG RAN which belong to different public land mobile (PLMN) networks, it is necessary to establish a session connection in each of EPS and 5GS. The terminal device registers with the VAE server through the session connections established in EPS and 5GS respectively, where the registration request carries a same application ID, such as general public subscription identifier (GPSI)/mobile subscriber international ISDN number (MSISDN).

Step 802, a VAE server associates, according to GPSI/MSISDN, the terminal devices registered from EPS and 5GS as belonging to the same terminal device.

Step 803, the VAE server sends a monitoring request to the 5GS of the service terminal device, to acquire first network status information.

Step 804, the VAE server sends a monitoring request to the EPS of the service terminal device, to acquire second network status information.

There is no sequential relationship between step 803 and step 804, and step 803 may be executed first and then step 804 is executed, or step 804 may be executed first and then step 803 is executed, or step 803 and step 804 may be executed simultaneously.

Step 805, the VAE server generates instruction information, according to the first network status information and the second network status information.

Step 806, the VAE server sends the instruction information to the terminal device.

In the method for determining a communication mode provided by the embodiments of this application, the terminal device may access a VAE server through independent LTE network and 5G network. This approach enables the UE to select an appropriate communication mode from different types of networks under a scenario where different operators provide LTE network coverage and 5G network coverage respectively.

Figure 9:
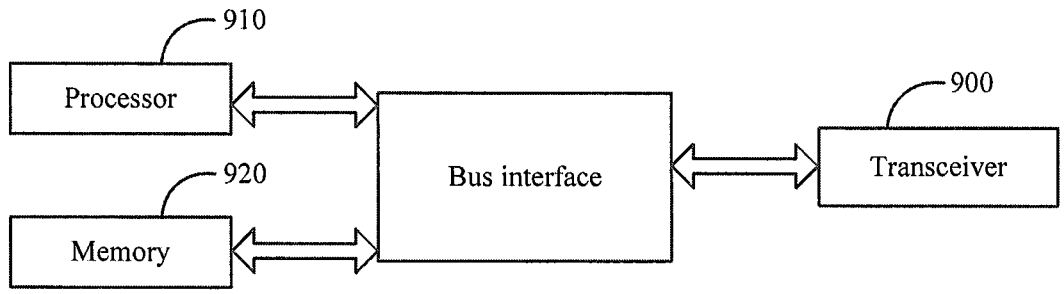
FIG. 9 is a schematic diagram of a server provided by an embodiment of this application.

FIG. 9 is a schematic diagram of a server provided by an embodiment of this application. As shown in FIG. 9, a transceiver 900 is configured to transmit and receive data under control of a processor 910.

In FIG. 9, a bus architecture may include any number of interconnected buses and bridges. In one embodiment, various circuits of one or more processors represented by the processor 910 and the memory represented by the memory 920 are linked together. The bus architecture may also link together various other circuits, such as peripheral devices, voltage regulators and power management circuits, which are well known in the art, and accordingly won't be further described herein. The bus interface provides an interface. The transceiver 900 may be elements, i.e., including a transmitter and a receiver, providing devices for communicating with various other apparatuses on transmission media, where these transmission media include a wireless channel, a wired channel, an optical cable and the like. The processor 910 is responsible for managing the bus architecture and general processing, and the memory 920 may store data used by the processor 910 upon performing operations.

The processor 910 may be a central processor (CPU), an application specific integrated circuit (ASIC), a field-programmable gate array (FPGA) or a complex programmable logic device (CPLD), and the processor may also adopt a multi-core architecture.

The processor is configured to execute any method provided by the embodiments of this application according to the executable instructions obtained by calling a computer program stored in the memory. The processor and the memory may also be physically separated.

The processor 910 is configured to read a computer program in the memory and perform the following operations:

receiving a first message sent by a terminal device;

acquiring, according to the first message, first network status information and second network status information in a target area, where the first network status information is network status information of a network with a first type of radio access, and the second network status information is network status information of a network with a second type of radio access;

determining instruction information, according to the first network status information and the second network status information, where the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access; and sending the instruction information to the terminal device.

In an embodiment, the first message includes an identifier of a cell of a network with the first type of radio access and an identifier of a cell of a network with the second type of radio access in the target area; and the processor 910 is specifically configured to:

determine, according to the first message, to acquire, from a first network system and/or a second network system, the first network status information of the cell of a network with the first type of radio access and the second network status information of the cell of a network with the second type of radio access.

In an embodiment, the first message includes information indicating that the terminal device has a capacity of supporting PC5 communication for the first type of radio access and a capacity of supporting PC5 communication for the second type of radio access; and the processor 910 is specifically configured to:

determine, according to the information indicating that the terminal device has the capacity of supporting PC5 communication for the first type of radio access and the capacity of supporting PC5 communication for the second type of radio access, to acquire the first network status information and the second network status information in the target area, from a first network system and/or a second network system.

In an embodiment, the target area includes an area corresponding to a current location of the terminal device; or the target area includes a location area corresponding to the terminal device, where the location area is predicted by analyzing mobility data of the terminal device acquired from an NWDAF.

In an embodiment, the processor 910 is specifically configured to:

send a first request message to the first network system or the second network system, where the first request message includes identification information of the target area; and receive the first network status information and the second network status information in the target area that are sent by the first network system or the second network system; or send a second request message to each of the first network system and the second network system, where the second request message includes identification information of the target area; and receive the first network status information in the target area sent by the first network system, and receive the second network status information in the target area sent by the second network system.

In an embodiment, each of the first network status information and the second network status information includes predicted network information in the target area; and the processor 910 is specifically configured to:

send a third request message to an NWDAF, according to the first message; and receive the predicted network information sent by the NWDAF, where the predicted network information includes at least one of load information, wireless coverage information and communication link status information.

In an embodiment, the instruction information includes identification information of the target communication mode; and the processor 910 is specifically configured to:

acquire current communication link status information of the terminal device; and determine the identification information of the target communication mode, according to the current communication link status information of the terminal device, the first network status information and the second network status information.

In an embodiment, the instruction information includes auxiliary information, where the auxiliary information includes at least one of the following:

coverage information for the first type of radio access and coverage information for the second type of radio access in the target area; or load information of a cell for the first type of radio access and load information of a cell for the second type of radio access in the target area; or QoS guarantee of a cell for the first type of radio access and QoS guarantee of a cell for the second type of radio access in the target area.

In an embodiment, the instruction information includes auxiliary information, where the auxiliary information includes at least one of the following:

predicted coverage information for the first type of radio access and predicted coverage information for the second type of radio access in the target area; or predicted load information of a cell for the first type of radio access and predicted load information of a cell for the second type of radio access in the target area; or predicted QoS guarantee of a cell for the first type of radio access and predicted QoS guarantee of a cell for the second type of radio access in the target area.

Here, it should be noted that the apparatus provided by this application can realize all the method steps realized by the above method embodiments, and can achieve the same effects, and parts and beneficial effects in this embodiment that are the same as the method embodiments are not described in detail herein.

Figure 10:
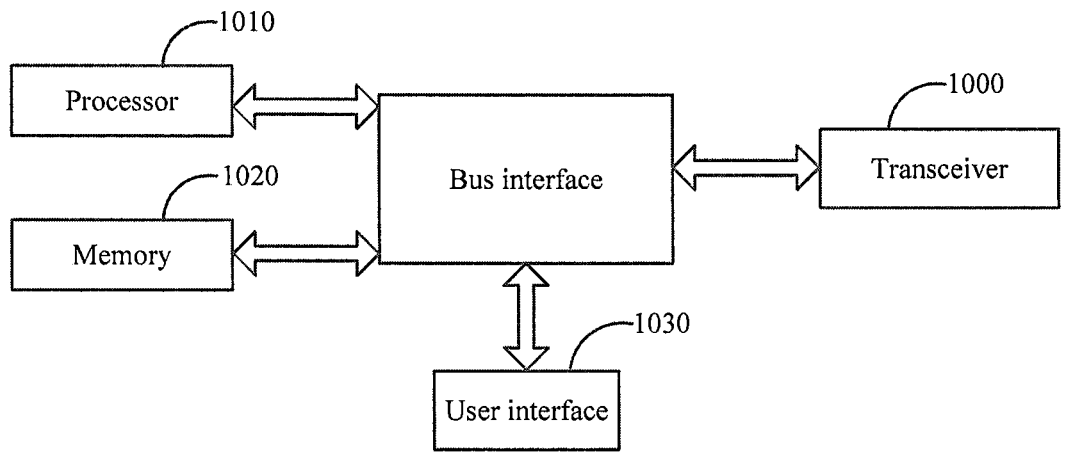
FIG. 10 is a schematic diagram of a terminal device provided by an embodiment of this application.

FIG. 10 is a schematic diagram of a terminal device provided by an embodiment of this application. As shown in FIG. 10, a transceiver 1000 is configured to transmit and receive data under control of a processor 1010.

Where in FIG. 10, a bus architecture may include any number of interconnected buses and bridges. Specifically, various circuits of one or more processors represented by the processor 1010 and the memory represented by the memory 1020 are linked together. The bus architecture may also link together various other circuits, such as peripheral devices, voltage regulators and power management circuits, which are well known in the art, and accordingly won't be further described herein. The bus interface provides an interface. The transceiver 1000 may be elements, i.e., including a transmitter and a receiver, providing devices for communicating with various other apparatuses on transmission media, where these transmission media include a wireless channel, a wired channel, an optical cable and the like. For different user equipments, the user interface 1030 may also be an interface capable of externally and internally connecting needed devices, where the connected devices include but not limit to a keypad, a display, a speaker, a microphone, a joystick and the like.

The processor 1010 is responsible for managing the bus architecture and general processing, and the memory 1020 may store data used by the processor 1010 upon performing operations.

In an embodiment, the processor 1010 may be a CPU (central processor), an application specific integrated circuit (ASIC), a field-programmable gate array (FPGA) or a Complex Programmable Logic Device (CPLD), and the processor may also adopt a multi-core architecture.

The processor is configured to execute any method provided by the embodiments of this application according to the executable instructions obtained by calling a computer program stored in the memory. The processor and the memory may also be physically separated.

The processor 1010 is configured to read a computer program in the memory and perform the following operations:

sending a first message to a server, where the first message is used to instruct the server to acquire first network status information and second network status information in a target area, and then determine instruction information, according to the first network status information and the second network status information, where the first network status information is network status information of a network with a first type of radio access, the second network status information is network status information of a network with a second type of radio access, the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access;

receiving the instruction information sent by the server; and determining the target communication mode according to the instruction information.

In an embodiment, the first message includes an identifier of a cell of a network with the first type of radio access and an identifier of a cell of a network with the second type of radio access in the target area.

In an embodiment, the first message includes information indicating that the terminal device has a capacity of supporting PC5 communication for the first type of radio access and a capacity of supporting PC5 communication for the second type of radio access.

In an embodiment, the target area includes a current location of the terminal device; or the target area includes a location area corresponding to the terminal device, where the location area is predicted by analyzing mobility data of the terminal device acquired from an NWDAF.

In an embodiment, the instruction information includes identification information of the target communication mode.

In an embodiment, the instruction information includes auxiliary information, where the auxiliary information includes at least one of the following:

coverage information for the first type of radio access and coverage information for the second type of radio access in the target area;

load information of a cell for the first type of radio access and load information of a cell for the second type of radio access in the target area; or QoS guarantee of a cell for the first type of radio access and QoS guarantee of a cell for the second type of radio access in the target area.

In an embodiment, the instruction information includes auxiliary information, where the auxiliary information includes at least one of the following:

predicted coverage information for the first type of radio access and predicted coverage information for the second type of radio access in the target area;

predicted load information of a cell for the first type of radio access and predicted load information of a cell for the second type of radio access in the target area; or predicted QoS guarantee of a cell for the first type of radio access and predicted QoS guarantee of a cell for the second type of radio access in the target area.

Here, it should be noted that the apparatus provided by this application can realize all the method steps realized by the above method embodiments, and can achieve the same effects, and parts and beneficial effects in this embodiment that are the same as the method embodiments are not described in detail herein.

Figure 11:
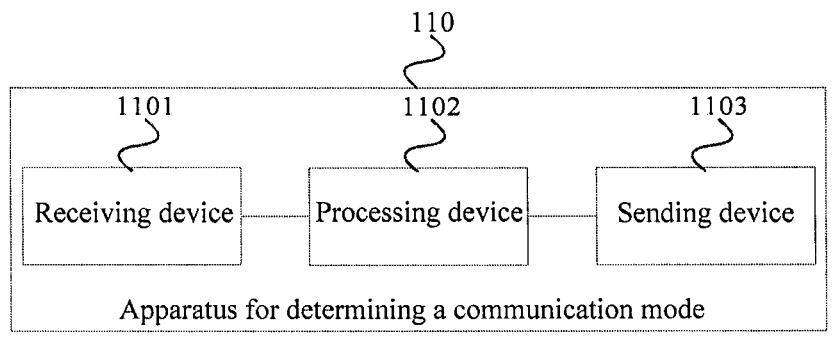
FIG. 11 is a schematic diagram of an apparatus for determining a communication mode provided by an embodiment of this application.

FIG. 11 is a schematic diagram of an apparatus for determining a communication mode provided by an embodiment of this application. For example, referring to FIG. 11, the apparatus for determining a communication mode 110 may include:

a receiving device 1101, configured to receive a first message sent by a terminal device;

a processing device 1102, configured to acquire, according to the first message, first network status information and second network status information in a target area, where the first network status information is network status information of a network with a first type of radio access, and the second network status information is network status information of a network with a second type of radio access;

the processing device 1102 is further configured to determine instruction information, according to the first network status information and the second network status information, where the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access; and a sending device 1103, configured to send the instruction information to the terminal device.

In an embodiment, the first message includes an identifier of a cell of a network with the first type of radio access and an identifier of a cell of a network with the second type of radio access in the target area; and the processing device 1102 is specifically configured to:
determine, according to the first message, to acquire, from a first network system and/or a second network system, the first network status information of the cell of a network with the first type of radio access and the second network status information of the cell of a network with the second type of radio access.

In an embodiment, the first message includes information indicating that the terminal device has a capacity of supporting PC5 communication for the first type of radio access and a capacity of supporting PC5 communication for the second type of radio access; and the processing device 1102 is specifically configured to:
determine, according to the information indicating that the terminal device has the capacity of supporting PC5 communication for the first type of radio access and the capacity of supporting PC5 communication for the second type of radio access, to acquire the first network status information and the second network status information in the target area, from a first network system and/or a second network system.

In an embodiment, the target area includes an area corresponding to a current location of the terminal device; or
the target area includes a location area corresponding to the terminal device, where the location area is predicted by analyzing mobility data of the terminal device acquired from an NWDAF.

In an embodiment, the processing device 1102 is specifically configured to:
send a first request message to the first network system or the second network system, where the first request message includes identification information of the target area; and receive the first network status information and the second network status information in the target area that are sent by the first network system or the second network system; or,
send a second request message to each of the first network system and the second network system, where the second request message includes identification information of the target area; and receive the first network status information in the target area sent by the first network system, and receive the second network status information in the target area sent by the second network system.

In an embodiment, each of the first network status information and the second network status information includes predicted network information in the target area; and the processing device 1102 is specifically configured to:
send a third request message to an NWDAF, according to the first message; and
receive the predicted network information sent by the NWDAF, where the predicted network information includes at least one of load information, wireless coverage information and communication link status information.

In an embodiment, the instruction information includes identification information of the target communication mode; and
the processing device 1102 is specifically configured to:
acquire current communication link status information of the terminal device; and
determine the identification information of the target communication mode, according to the current communication link status information of the terminal device, the first network status information and the second network status information.

In an embodiment, the instruction information includes auxiliary information, where the auxiliary information includes at least one of the following:
coverage information for the first type of radio access and coverage information for the second type of radio access in the target area; or
load information of a cell for the first type of radio access and load information of a cell for the second type of radio access in the target area; or
QoS guarantee of a cell for the first type of radio access and QoS guarantee of a cell for the second type of radio access in the target area.

In an embodiment, the instruction information includes auxiliary information, where the auxiliary information includes at least one of the following:
predicted coverage information for the first type of radio access and predicted coverage information for the second type of radio access in the target area; or
predicted load information of a cell for the first type of radio access and predicted load information of a cell for the second type of radio access in the target area; or
predicted QoS guarantee of a cell for the first type of radio access and predicted QoS guarantee of a cell for the second type of radio access in the target area.

Here, it should be noted that the apparatus provided by this application can realize all the method steps realized by the above method embodiments, and can achieve the same effects, and parts and beneficial effects in this embodiment that are the same as the method embodiments are not described in detail herein.

Figure 12:
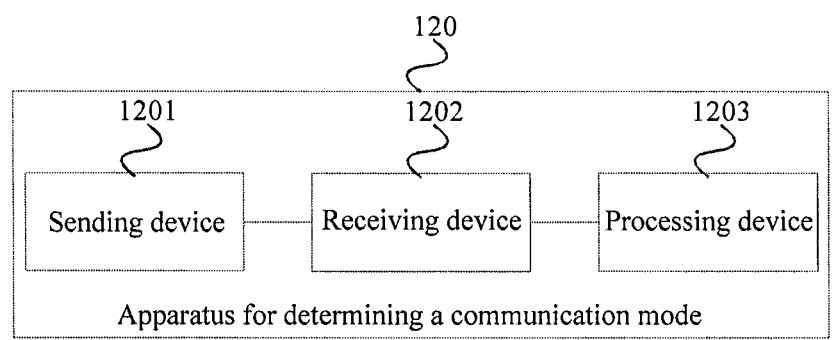
FIG. 12 is a schematic diagram of another apparatus for determining a communication mode provided by an embodiment of this application.

FIG. 12 is a schematic diagram of another apparatus for determining a communication mode provided by an embodiment of this application. For example, referring to FIG. 12, the apparatus for determining a communication mode 120 may include:
a sending device 1201, configured to send a first message to a server, where the first message is used to instruct the server to acquire first network status information and second network status information in a target area, and then determine instruction information, according to first network status information and second network status information, where the first network status information is network status information of a network with a first type of radio access, the second network status information is network status information of a network with a second type of radio access, the instruction information is used to determine a target communication mode of the terminal device, and the target communication mode includes a Uu communication mode for the first type of radio access, a PC5 communication mode for the first type of radio access, a Uu communication mode for the second type of radio access or a PC5 communication mode for the second type of radio access;

a receiving device 1202, configured to receive the instruction information sent by the server; and a processing device 1203, configured to determine the target communication mode according to the instruction information.

In an embodiment, the first message includes an identifier of a cell of a network with the first type of radio access and an identifier of a cell of a network with the second type of radio access in the target area.

In an embodiment, the first message includes information indicating that the terminal device has a capacity of supporting PC5 communication for the first type of radio access and a capacity of supporting PC5 communication for the second type of radio access.

In an embodiment, the target area includes a current location of the terminal device; or the target area includes a location area corresponding to the terminal device, where the location area is predicted by the server through analyzing mobility data of the terminal device acquired from an NWDAF.

In an embodiment, the instruction information includes identification information of the target communication mode.

In an embodiment, the instruction information includes auxiliary information, where the auxiliary information includes at least one of the following:

coverage information for the first type of radio access and coverage information for the second type of radio access in the target area;

load information of a cell for the first type of radio access and load information of a cell for the second type of radio access in the target area; or QoS guarantee of a cell for the first type of radio access and QoS guarantee of a cell for the second type of radio access in the target area.

In an embodiment, the instruction information includes auxiliary information, where the auxiliary information includes at least one of the following:

predicted coverage information for the first type of radio access and predicted coverage information for the second type of radio access in the target area;

predicted load information of a cell for the first type of radio access and predicted load information of a cell for the second type of radio access in the target area; or predicted QoS guarantee of a cell for the first type of radio access and predicted QoS guarantee of a cell for the second type of radio access in the target area.

Here, it should be noted that the apparatus provided by this application can realize all the method steps realized by the above method embodiments, and can achieve the same effects, and parts and beneficial effects in this embodiment that are the same as the method embodiments are not described in detail herein.

It should be noted that the division of units in the embodiments of this application is schematic, which is only a logical function division, and there may be another division method in actual implementation. Furthermore, individual function units in the embodiments of this application may be integrated into one processing unit, or each unit may be separate physically, or two or more units may be integrated into one unit. The above-mentioned integrated unit may be implemented in the form of hardware or software function unit.

If the integrated unit is implemented in the form of a software function unit and sold or used as an independent product, it may be stored in a processor-readable storage medium. Based on this understanding, the application is essentially a part that contributes to the prior art or all or part of may be embodied in the form of a software product, and the computer software product is stored in a storage medium and includes several instructions to enable a computer device (which may be a personal computer, a server, or a network equipment, etc.) or a processor to execute all or part of the steps of the method described in each embodiment of this application. The foregoing storage medium includes various media that may store program codes, such as, a USB flash disk, a mobile hard disk, a read-only memory (ROM), a random access memory (RAM), a magnetic disk, or an optical disk, etc.

The embodiments of this application also provide a processor-readable storage medium, where the processor-readable storage medium stores a computer program, and the computer program is configured to enable a processor to execute the method for determining a communication mode as described in the above method embodiments.

The processor-readable storage medium may be any available medium or data storage device that the processor can access, including but not limited to a magnetic memory (such as, a floppy disk, a hard disk, a magnetic tape, a magneto-optical disk (MO), etc.), an optical memory (such as, CD, DVD, BD, HVD, etc.), and semiconductor memory (such as ROM, EPROM, EEPROM, non-volatile memory (NAND FLASH), solid state hard disk (SSD)), etc.

The embodiments of this application may be provided as a method, a system, or a computer program product. Therefore, this application can take the form of an entirely hardware embodiment, an entirely software embodiment, or an embodiment combining the software and hardware aspects. Moreover, this application may take the form of a computer program product implemented on one or more computer-usable storage media (including but not limited to a magnetic disk storage, an optical storage, etc.) containing computer-usable program codes therein.

This application is described with reference to flowcharts and/or block diagrams of the method, the device (system), and the computer program product according to the embodiments of this application. It should be understood that each flow and/or block in the flowchart and/or block diagram, and combinations of the flow and/or block in the flowchart and/or block diagram may be implemented by computer-executable instructions. These computer-executable instructions may be provided to a processor of a general-purpose computer, a special-purpose computer, an embedded processor or other programmable data processing devices to produce a machine, and the instructions executed by the processor of the computer or other programmable data processing devices produce means for implementing the functions specified in one or more flows in the flowchart and/or one or more blocks in the block diagram.

These processor-executable instructions may also be stored in a processor-readable memory that can direct a computer or other programmable data processing devices to function in a particular manner, and the instructions stored in the processor-readable memory produce an article of manufacture including instructing means that implement the functions specified in one or more flows in the flowchart and/or one or more blocks in the block diagram.

These processor-executable instructions may also be loaded onto a computer or other programmable data processing devices, and a series of operational steps are performed on the computer or other programmable devices to produce a computer-implemented processing, and the instructions executed on the computer or other programmable devices provide steps for implementing the functions specified in one or more flows in the flowchart and/or one or more blocks in the block diagram.

The invention claimed is:

1. A method for determining a communication mode, the method being applied to a server, and the method comprising:
   receiving a first message sent by a user equipment (UE);
   acquiring, according to the first message, first network status information and second network status information in a target area, wherein the first network status information is network status information of a network with a first type of radio access, and the second network status information is network status information of a network with a second type of radio access;
   determining indication information, according to the first network status information and the second network status information, wherein the indication information is used to determine a target communication mode of the UE, and the target communication mode comprises a Uu communication mode for the first type of radio access, a PC5 communication mode for the first type of radio access, a Uu communication mode for the second type of radio access or a PC5 communication mode for the second type of radio access; and
   sending the indication information to the UE.

2. The method according to claim 1, wherein the first message comprises an identifier of a cell of a network with the first type of radio access and an identifier of a cell of a network with the second type of radio access in the target area; and
   the acquiring, according to the first message, the first network status information and the second network status information in the target area comprises:
   determining, according to the first message, to acquire, from a first network system and/or a second network system, the first network status information of the cell of a network with the first type of radio access and the second network status information of the cell of a network with the second type of radio access.

3. The method according to claim 1, wherein the first message comprises information indicating that the UE has a capacity of supporting PC5 communication for the first type of radio access and a capacity of supporting PC5 communication for the second type of radio access; and
   the acquiring, according to the first message, the first network status information and the second network status information in the target area comprises:
   determining, according to the information indicating that the UE has the capacity of supporting PC5 communication for the first type of radio access and the capacity of supporting PC5 communication for the second type of radio access, to acquire the first network status information and the second network status information in the target area, from a first network system and/or a second network system.

4. The method according to claim 1, wherein
   the target area comprises an area corresponding to a current location of the UE; or
   the target area comprises a location area corresponding to the UE, wherein the location area is predicted by analyzing mobility data of the UE acquired from a network data analytics function (NWDAF).

5. The method according to claim 1, wherein the acquiring, according to the first message, the first network status information and the second network status information in the target area comprises:
   sending a first request message to a first network system or a second network system, wherein the first request message comprises identification information of the target area; and receiving the first network status information and the second network status information in the target area that are sent by the first network system or the second network system; or
   sending a second request message to each of a first network system and a second network system, wherein the second request message comprises identification information of the target area; and receiving the first network status information in the target area sent by the first network system, and receiving the second network status information in the target area sent by the second network system.

6. The method according to claim 1, wherein each of the first network status information and the second network status information comprises predicted network information in the target area; and
   the acquiring, according to the first message, the first network status information and the second network status information in the target area comprises:
   sending a third request message to an NWDAF, according to the first message; and
   receiving the predicted network information sent by the NWDAF, wherein the predicted network information comprises at least one of load information, wireless coverage information and communication link status information.

7. The method according to claim 1, wherein the indication information comprises identification information of the target communication mode; and
   the determining the indication information according to the first network status information and the second network status information comprises:
   acquiring current communication link status information of the UE; and
   determining the identification information of the target communication mode, according to the current communication link status information of the UE, the first network status information and the second network status information.

8. The method according to claim 1, wherein the indication information comprises auxiliary information, and the auxiliary information comprises at least one of the following:
   coverage information for the first type of radio access and coverage information for the second type of radio access in the target area; or
   load information of a cell for the first type of radio access and load information of a cell for the second type of radio access in the target area; or
   quality of service (QOS) guarantee of a cell for the first type of radio access and QoS guarantee of a cell for the second type of radio access in the target area.

9. The method according to claim 1, wherein the indication information comprises auxiliary information, and the auxiliary information comprises at least one of the following:

predicted coverage information for the first type of radio access and predicted coverage information for the second type of radio access in the target area; or predicted load information of a cell for the first type of radio access and predicted load information of a cell for the second type of radio access in the target area; or predicted QoS guarantee of a cell for the first type of radio access and predicted QOS guarantee of a cell for the second type of radio access in the target area.

10. A server, comprising a memory, a transceiver and a processor,
wherein the memory is configured to store a computer program; the transceiver is configured to send and receive data under control of the processor; and the processor is configured to read the computer program in the memory and perform the method according to claim 1.

11. A non-transitory processor-readable storage medium, wherein the processor-readable storage medium stores a computer program for causing a processor to execute the method according to claim 1.

12. A method for determining a communication mode, the method being applied to a user equipment (UE), and the method comprising:
sending a first message to a server, wherein the first message is used to instruct the server to acquire first network status information and second network status information in a target area, and then determine indication information, according to the first network status information and the second network status information, the first network status information is network status information of a network with a first type of radio access, the second network status information is network status information of a network with a second type of radio access, the indication information is used to determine a target communication mode of the UE, and the target communication mode comprises a Uu communication mode for the first type of radio access, a PC5 communication mode for the first type of radio access, a Uu communication mode for the second type of radio access or a PC5 communication mode for the second type of radio access;
receiving the indication information sent by the server; and
determining the target communication mode, according to the indication information.

13. The method according to claim 12, wherein the first message comprises an identifier of a cell of a network with the first type of radio access and an identifier of a cell of a network with the second type of radio access in the target area.

14. The method according to claim 12, wherein the first message comprises information indicating that the UE has a capacity of supporting PC5 communication for the first type of radio access and a capacity of supporting PC5 communication for the second type of radio access.

15. The method according to claim 12, wherein
the target area comprises a current location of the UE; or
the target area comprises a location area corresponding to the UE, wherein the location area is predicted by the server through analyzing mobility data of the UE acquired from a network data analytics function (NWDAF).

16. The method according to claim 12, wherein the indication information comprises identification information of the target communication mode.

17. The method according to claim 12, wherein the indication information comprises auxiliary information, and the auxiliary information comprises at least one of the following:
coverage information for the first type of radio access and coverage information for the second type of radio access in the target area;
load information of a cell for the first type of radio access and load information of a cell for the second type of radio access in the target area; or
quality of service (QOS) guarantee of a cell for the first type of radio access and QoS guarantee of a cell for the second type of radio access in the target area.

18. The method according to claim 12, wherein the indication information comprises auxiliary information, and the auxiliary information comprises at least one of the following:
predicted coverage information for the first type of radio access and predicted coverage information for the second type of radio access in the target area;
predicted load information of a cell for the first type of radio access and predicted load information of a cell for the second type of radio access in the target area; or
predicted QoS guarantee of a cell for the first type of radio access and predicted QoS guarantee of a cell for the second type of radio access in the target area.

19. A non-transitory processor-readable storage medium, wherein the processor-readable storage medium stores a computer program for causing a processor to execute the method according to claim 12.

20. A user equipment (UE), comprising a memory, a transceiver and a processor,
wherein the memory is configured to store a computer program; the transceiver is configured to send and receive data under control of the processor; and the processor is configured to read the computer program in the memory and perform the following operations:
sending a first message to a server, wherein the first message is used to instruct the server to acquire first network status information and second network status information in a target area, and then determine indication information, according to the first network status information and the second network status information, the first network status information is network status information of a network with a first type of radio access, the second network status information is network status information of a network with a second type of radio access, the indication information is used to determine a target communication mode of the UE, and the target communication mode comprises a Uu communication mode for the first type of radio access, a PC5 communication mode for the first type of radio access, a Uu communication mode for the second type of radio access or a PC5 communication mode for the second type of radio access;
receiving the indication information sent by the server; and
determining the target communication mode, according to the indication information.

* * * * *